United States Patent
El Essaili et al.

(10) Patent No.: US 12,004,057 B2
(45) Date of Patent: *Jun. 4, 2024

(54) METHODS, APPARATUS, AND COMPUTER-READABLE MEDIA FOR DISCOVERY OF APPLICATION SERVER AND/OR SERVICES FOR V2X COMMUNICATIONS

(71) Applicant: Telefonaktiebolaget LM Ericsson (publ), Stockholm (SE)

(72) Inventors: Ali El Essaili, Aachen (DE); Thorsten Lohmar, Aachen (DE); Maciej Muehleisen, Eynatten (BE); John Camilo Solano Arenas, Dusseldorf (DE); Yunpeng Zang, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/975,678

(22) Filed: Oct. 28, 2022

(65) Prior Publication Data

US 2023/0069397 A1 Mar. 2, 2023

Related U.S. Application Data

(63) Continuation of application No. 17/244,382, filed on Apr. 29, 2021, now Pat. No. 11,523,257, which is a
(Continued)

(51) Int. Cl.
*H04W 4/40* (2018.01)
*H04L 41/50* (2022.01)
(Continued)

(52) U.S. Cl.
CPC .......... *H04W 4/40* (2018.02); *H04L 41/5058* (2013.01); *H04L 61/4511* (2022.05); *H04W 4/50* (2018.02); *H04W 76/11* (2018.02); *H04W 84/042* (2013.01)

(58) Field of Classification Search
CPC ............. H04L 41/5058; H04L 61/4511; H04L 61/4541; H04L 67/51; H04W 4/40;
(Continued)

(56) References Cited

U.S. PATENT DOCUMENTS 9,355,559 B1   5/2016  Bowen et al.
10,534,932 B2  1/2020  Wang et al.
(Continued)

FOREIGN PATENT DOCUMENTS

CN   106850553 A   6/2017
CN   109275172 A   1/2019
(Continued)

OTHER PUBLICATIONS

"3GPP TS 23.280 V16.1.0", 3rd Generation Partnership Project; Technical Specification Group Services and System Aspects; Common functional architecture to support mission critical services; Stage 2 (Release 16), Dec. 2018, pp. 1-206.
(Continued)

*Primary Examiner* — Shah M Rahman
(74) *Attorney, Agent, or Firm* — Murphy, Bilak & Homiller, PLLC

(57) ABSTRACT

Embodiments include methods performed by a V2X user equipment (UE) for service discovery from a V2X application server (AS). Such methods include sending, to a first address associated with the V2X AS, a first request for further address information associated with the V2X AS. Such methods include receiving, from the first address via unicast signaling, a first response including the requested
(Continued)

further address information, which facilitates UE discovery of V2X services available via unicast communication between the V2X UE and a radio access network (RAN). Other embodiments include complementary methods performed by a V2X AS, as well as V2X UE and V2X AS apparatus configured to perform such methods.

22 Claims, 13 Drawing Sheets

Related U.S. Application Data continuation of application No. 16/443,171, filed on Jun. 17, 2019, now Pat. No. 11,026,069.

(60) Provisional application No. 62/807,110, filed on Feb. 18, 2019.

(51) Int. Cl.
*H04L 61/4511* (2022.01)
*H04W 4/50* (2018.01)
*H04W 76/11* (2018.01)
*H04W 84/04* (2009.01)

(58) Field of Classification Search
CPC ......... H04W 4/44; H04W 4/50; H04W 76/11; H04W 8/005; H04W 84/042; H04W 88/14
See application file for complete search history.

(56) References Cited

U.S. PATENT DOCUMENTS

| | | | |
|---|---|---|---|
| 10,932,095 B2* | 2/2021 | Dao | H04W 4/06 |
| 2014/0192698 A1* | 7/2014 | Anchan | H04L 1/0002 370/312 |
| 2015/0078245 A1* | 3/2015 | Anchan | H04M 13/00 370/312 |
| 2016/0007320 A1* | 1/2016 | Wang | H04L 12/189 370/312 |
| 2017/0013648 A1* | 1/2017 | Jung | H04W 76/14 |
| 2017/0142766 A1 | 5/2017 | Kim | |
| 2017/0201934 A1 | 7/2017 | Kim et al. | |
| 2017/0288886 A1 | 10/2017 | Atarius et al. | |
| 2017/0295484 A1* | 10/2017 | You | H04W 8/005 |
| 2017/0330457 A1 | 11/2017 | Bhalla | |
| 2017/0332213 A1 | 11/2017 | Xu et al. | |
| 2017/0374109 A1* | 12/2017 | Atarius | H04L 65/1104 |
| 2018/0035276 A1 | 2/2018 | Kang et al. | |
| 2018/0035399 A1 | 2/2018 | Xu et al. | |
| 2018/0049073 A1 | 2/2018 | Dinan et al. | |
| 2018/0063825 A1 | 3/2018 | Van Phan et al. | |
| 2018/0069618 A1* | 3/2018 | Loehr | H04W 72/1263 |
| 2018/0083347 A1 | 3/2018 | Lee | |
| 2018/0159935 A1 | 6/2018 | Cavalcanti et al. | |
| 2018/0167790 A1 | 6/2018 | Cavalcanti et al. | |
| 2018/0176891 A1 | 6/2018 | Kim et al. | |
| 2018/0192268 A1 | 7/2018 | Xu et al. | |
| 2018/0206089 A1 | 7/2018 | Cavalcanti et al. | |
| 2018/0213549 A1 | 7/2018 | Kim et al. | |
| 2018/0227974 A1 | 8/2018 | Puttagunta et al. | |
| 2018/0242115 A1 | 8/2018 | Kim et al. | |
| 2018/0295474 A1 | 10/2018 | Lee et al. | |
| 2018/0295655 A1* | 10/2018 | Cavalcanti | H04W 76/10 |
| 2018/0324560 A1 | 11/2018 | Xu et al. | |
| 2019/0020986 A1 | 1/2019 | Lee et al. | |
| 2019/0052714 A1 | 2/2019 | Shin et al. | |
| 2019/0058981 A1 | 2/2019 | Xu et al. | |
| 2019/0110175 A1 | 4/2019 | Chun et al. | |
| 2019/0124623 A1 | 4/2019 | Xu et al. | |
| 2019/0150046 A1 | 5/2019 | Shiga et al. | |
| 2019/0166580 A1* | 5/2019 | Prasad | H04W 72/30 |
| 2019/0193749 A1 | 6/2019 | Choi | |
| 2019/0289459 A1 | 9/2019 | Shan | |
| 2020/0017108 A1 | 1/2020 | Bae et al. | |
| 2020/0059767 A1 | 2/2020 | Woo et al. | |
| 2020/0092685 A1 | 3/2020 | Fehrenbach et al. | |
| 2020/0106624 A1 | 4/2020 | Russell et al. | |
| 2020/0178048 A1 | 6/2020 | Kim et al. | |
| 2020/0236621 A1 | 7/2020 | Yamada et al. | |
| 2020/0305167 A1 | 9/2020 | Freda et al. | |
| 2020/0344576 A1* | 10/2020 | Li | H04L 12/185 |
| 2021/0058748 A1* | 2/2021 | Liao | H04W 76/11 |
| 2021/0266726 A1 | 8/2021 | Chun | |
| 2021/0385685 A1 | 12/2021 | Khoryaev et al. | |
| 2021/0400738 A1 | 12/2021 | Ali et al. | |

FOREIGN PATENT DOCUMENTS

| | | |
|---|---|---|
| CN | 107409380 B | 6/2021 |
| CO | 2017002288 U1 | 7/2018 |
| EP | 3928540 A1 | 12/2021 |
| KR | 20160121378 A | 10/2016 |
| KR | 20170057835 A | 5/2017 |
| KR | 20180021841 A | 3/2018 |
| KR | 20190002465 A | 1/2019 |
| WO | 03032580 A2 | 4/2003 |
| WO | 2017171806 A1 | 10/2017 |
| WO | 2017173072 A1 | 10/2017 |
| WO | 2017176329 A1 | 10/2017 |
| WO | 2018218098 A1 | 11/2018 |
| WO | 2018227039 A1 | 12/2018 |

OTHER PUBLICATIONS

"3GPP Ts 24.386 V15.2.0", 3rd Generation Partnership Project; Technical Specification Group Core Network and Terminals; User Equipment (UE) to V2X control function; protocol aspects; Stage 3 (Release 15), Dec. 2018, pp. 1-35.
"Conclusion for local V2X server discovery", SA WG2 Meeting #116; S2-163756 (revision of S2-163714); Vienna, Austria, Jul. 11-15, 2016, pp. 1-5.
"Local V2X server discover", TSG SA WG2 Meeting #114; S2-161691; (revision of S2~16xxxx) Sophia Antipolis, France, Apr. 11-15, 2016, pp. 1-2.
"R2-1806986 TS 36.331 Baseline CR for the UE capabilities", 3GPP TS 36.331 V15.1.0 (Mar. 2018); 3rd Generation Partnership Project; Technical Specification Group Radio Access Network; Evolved Universal Terrestrial Radio Access (E-UTRA); Radio Resource Control (RRC); Protocol specification (Release 15), Mar. 2018, pp. 1-787.
"Removal of charging related contents in TS 24.386", 3GPP TSG CT WG1 Meeting#102, C1-170792, Dubrovnik (Croatia), Feb. 13-17, 2017, pp. 1-33.
"3GPP TS 36.300 V15.4.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Dec. 2018, pp. 1-363.
Campolo, Claudia, et al., "Towards 5G Network Slicing for the V2X Ecosystem", Conference Paper, https://www.researchgate.net/publication/327635348, Jun. 2018, pp. 1-7.
Elshenawy, Mohamed, et al., "Scalable and Location-Aware ITS Content Management in Vehicular Environments", https://www.researchgate.net/publication/224167000_Scalable_and_Location-Aware_ITS_Content_Management_in_Vehicular_Environments, Jun. 21, 2010, pp. 1-7.
Husain, Syed, et al., "An Overview of Standardization efforts for enabling Vehicular-to-Everything Services", 2017 IEEE Conference on Standards for Communications and Networking (CSCN), 2017, pp. 109-114.
Husain, Syed, et al., "The Road to 5G V2X: Ultra-High Reliable Communications", 2018 IEEE Conference on Standards for Communications and Networking (CSCN); Paris, France, 2018, pp. 1-6.
"3GPP TR 23.725 V16.0.0", 3rd Generation Partnership Project; Technical Specification Group Services and System Aspects; Study

(56) References Cited

OTHER PUBLICATIONS on enhancement of Ultra-Reliable Low-Latency Communication (URLLC) support in the 5G Core network (5GC) (Release 16), Dec. 2018, pp. 1-76.
"3GPP TS 23.285 V15.2.0", 3rd Generation Partnership Project; Technical Specification Group Services and System Aspects; Architecture enhancements for V2X services (Release 15), Dec. 2018, 1-37.
"3GPP TS 23.286 V0.3.0", 3rd Generation Partnership Project; Technical Specification Group Services and System Aspects; Application layer support for V2X services; Functional architecture and information flows; (Release 16), Jan. 2019, pp. 1-49.
"3GPP TS 23.287 V0.1.0", 3rd Generation Partnership Project; Technical Specification Group Services and System Aspects; Architecture enhancements for 5G System (5GS) to support Vehicle-to-Everything (V2X) services (Release 16), Jan. 2019, pp. 1-22.
"3GPP TS 26.348 V16.0.0", 3rd Generation Partnership Project; Technical Specification Group Services and System Aspects; Northbound Application Programming Interface (API) for Multimedia Broadcast/Multicast Service (MBMS) at the xMB reference point (Release 16), Dec. 2018, pp. 1-45.
"PCR to V2X application message distribution", 3GPP TSG-SA WG6 Meeting #29; S6-190328; (revision of S6-19xxxx); Montreal, Canada, Feb. 25-Mar. 1, 2019, pp. 1-2.
"PCR V2X application server and V2X service discovery", 3GPP TSG-SA WG6 Meeting #29; S6-190329; (revision of S6-19xxxx); Montreal, Canada, Feb. 25-Mar. 1, 2019, pp. 1-5.

\* cited by examiner

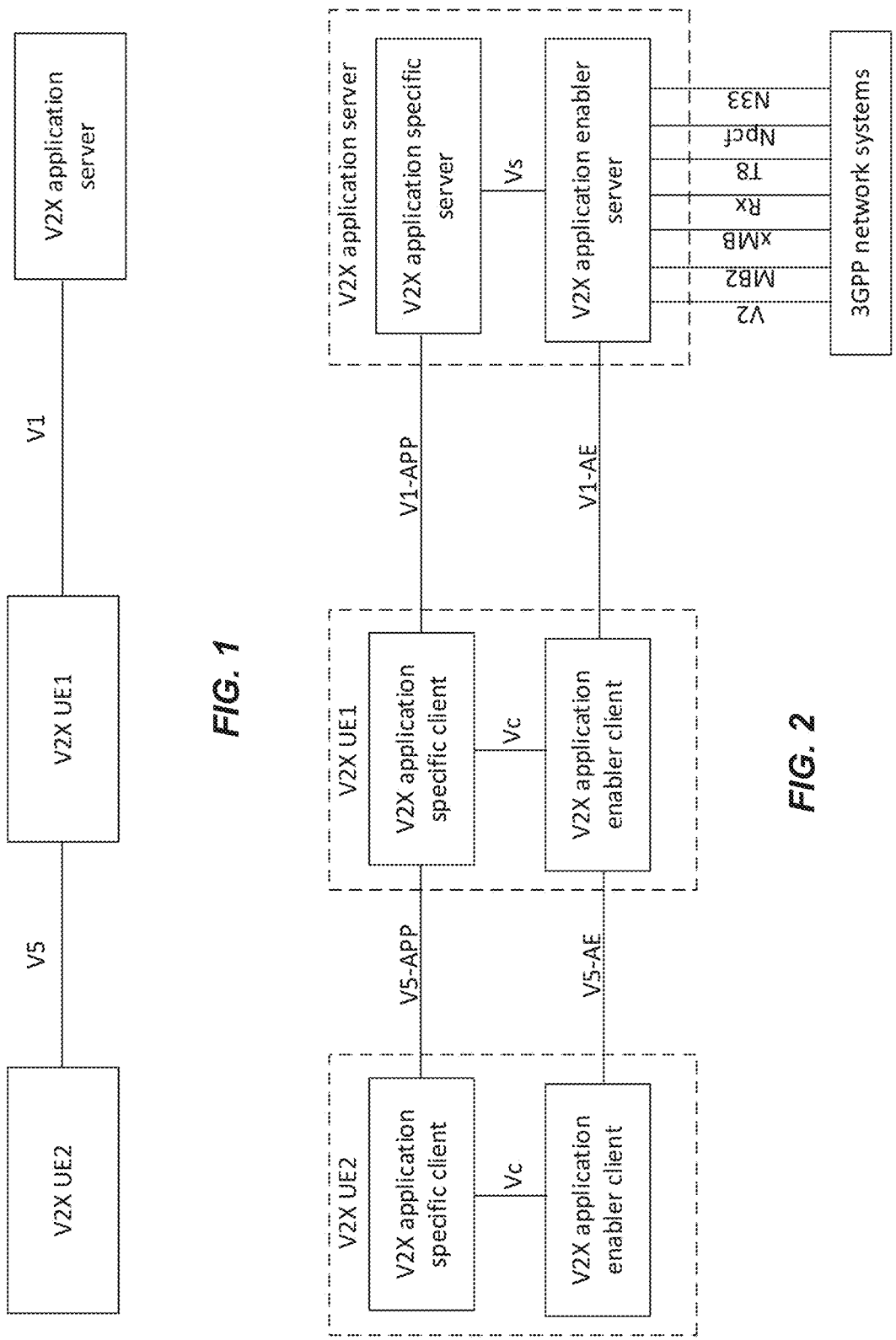

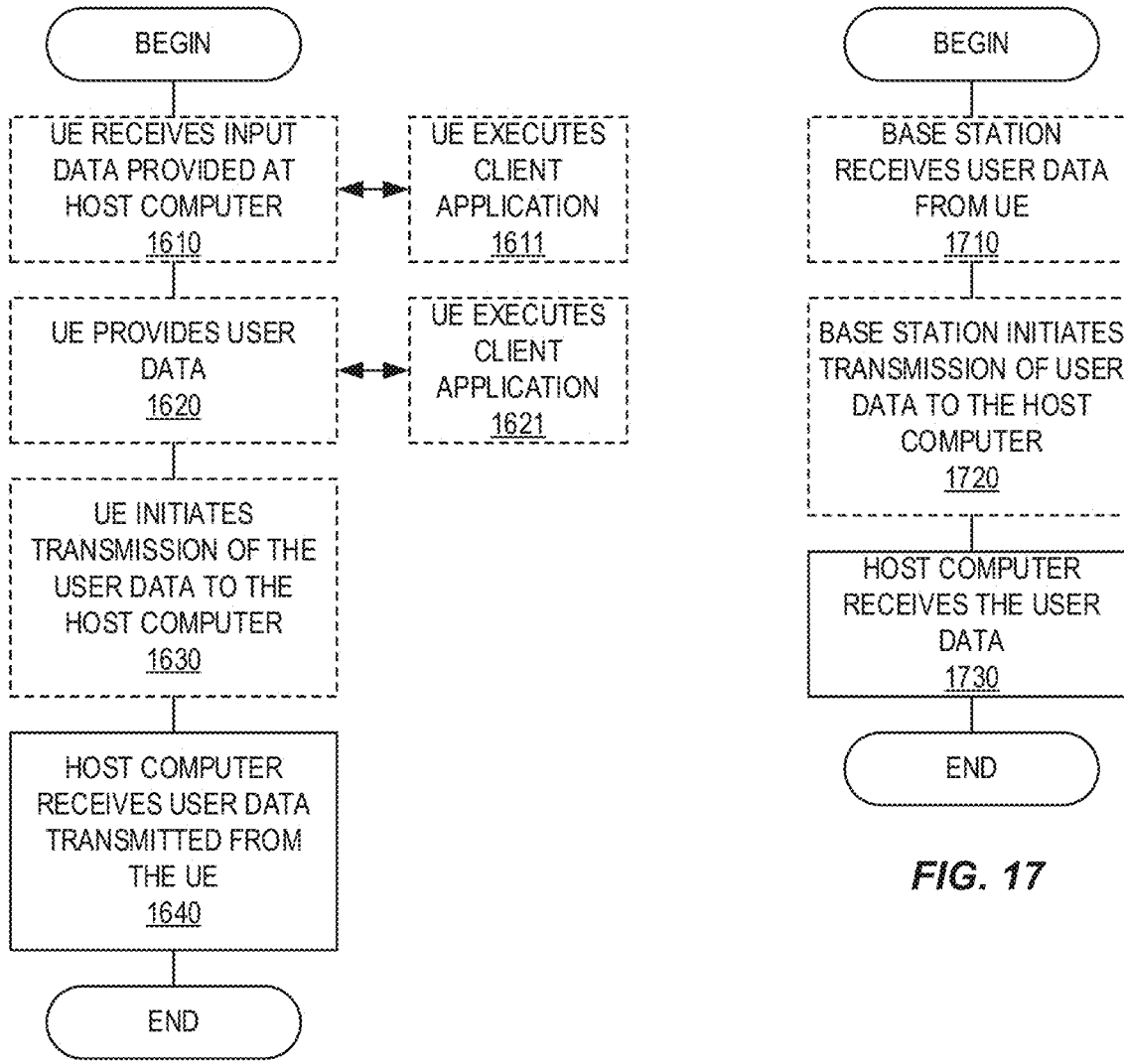

METHODS, APPARATUS, AND COMPUTER-READABLE MEDIA FOR DISCOVERY OF APPLICATION SERVER AND/OR SERVICES FOR V2X COMMUNICATIONS

TECHNICAL FIELD

The present application relates generally to the field of wireless communications, and more specifically to discovery and provision of intelligent transportation system (ITS) and/or vehicle-to-everything (V2X) services using long-range cellular unicast communication.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Cellular communication systems are currently being developed and improved for Intelligent Transportation Systems (ITS) applications, including road transport. Communication of vehicles with each other (vehicle-to-vehicle, or V2V), with infrastructure (V2I), and with vulnerable road users are expected to increase user safety and comfort, and to improve traffic management and/or reduce congestion, and to reduce vehicle fuel consumption and emissions. Collectively, these communication modes are commonly referred to as vehicle to everything (V2X). An extensive set of ITS-related use cases for V2X have been developed, and, based on these use cases, V2X communication requirements have been developed.

Within these use cases, the end-user communication equipment is commonly referred to as a user equipment (more specifically, V2X UE), and the entity serving an application associated with a user case is commonly referred to as an application server (more specifically, V2X AS). For example, FIG. 1 shows a simplified architectural model for the V2X application layer as specified in 3GPP Technical Standard (TS) 23.285. In the figure, the V2X UE1 communicates with V2X application server (AS) over V1 reference point, and the V2X UE1 and UE2 communicate over V5 reference point. In addition, V2X UE1 can act as a UE-to-network relay thereby enabling V2X UE2 to access the V2X application server over V1 reference point.

Furthermore, reference point V1 supports the V2X application-related interactions between V2X UE and V2X AS and is further specified in 3GPP TS 23.285. This reference point is supported for both unicast and multicast delivery modes. Likewise, reference point V5 supports the interactions between the V2X UEs and is also specified in 3GPP TS 23.285.

FIG. 2 shows a more detailed V2X application layer functional model. As compared to the architectural model shown in FIG. 1, the model shown in FIG. 2 specifies the functional entities at the V2X application layer. For example, the V2X application server (AS) consists of V2X application enabler (VAE) server (as discussed, e.g., in 3GPP Technical Report (TR) 23.275) and the V2X application-specific server. The VAE server provides the V2X application layer support functions to the V2X application-specific server over Vs reference point.

Similarly, each of the V2X UEs include a VAE client and a V2X application-specific client. The VAE client provides the V2X application layer support functions to the V2X application-specific client over Vc reference point. The VAE client of V2X UE1 communicates with the VAE server over V1-AE reference point, and the V2X application-specific client of V2X UE1 communicates with V2X application-specific server over V1-APP reference point. Similarly, the VAE client of V2X UE2 communicates with the VAE client of V2X UE2 over V5-AE reference point, and the V2X application-specific client of V2X UE2 communicates with the V2X application-specific client of V2X UE2 over V5-APP reference point. As discussed above, V2X UE1 can also act as a UE-to-network relay for V2X UE2, enabling the clients comprising V2X UE1 to access the V2X AS over the respective V1 reference points.

The VAE server interacts with 3GPP networks (e.g., Evovled Packet Subsystem (EPS) and/or 5G subsystem (5GS)) via the V2, MB2, xMB, Rx, T8, Npcf, and/or N33 reference points. A message on the V1-AE interface can be sent as unicast, transparent multicast via xMB, or transparent multicast via MB2. The non-transparent multicast via xMB (as specified in 3GPP TS 26.348) is triggered by a V1-AE message. Multicast distribution can be in either transparent or non-transparent mode.

Depending on the particular application, V2X and/or ITS messages may carry both safety-related and non-safety-related information. Moreover, each of the applications and services may be associated with specific requirements, e.g., latency, reliability, capacity, etc. European Telecommunication Standards Institute (ETSI) has defined two types of messages for road safety: Co-operative Awareness Message (CAM) and Decentralized Environmental Notification Message (DENM).

A CAM can be used by a vehicle (e.g., emergency vehicle) to broadcast a notification to surrounding vehicles and/or devices of the vehicle's presence and other relevant parameters. CAMs target other vehicles, pedestrians, and infrastructure, and are handled by their applications. CAMs also serve as active assistance to safety driving for normal traffic. The availability of a CAM is checked every 100 ms, yielding a maximum detection latency of 100 ms for most messages. However, the latency requirement for pre-crash sensing warning CAM is 50 ms. On the other hand, DENMs are event-triggered, such as by braking, and the availability of a DENM message is also checked every 100 ms, yielding a maximum detection latency of 100 ms. The package size of CAMs and DENMs varies from 100+ to 800+ bytes and the typical size is around 300 bytes. Each message is supposed to be detected by all vehicles in proximity.

A V2X UE can support unicast communication via the radio interface with the E-UTRAN (also referred to as "LTE-Uu" interface or reference point), or over the PC5 interface. The term "E-UTRAN" is used in 3GPP standards to refer to the Long-Term Evolution (LTE) radio access network (RAN). Support of V2X services via the PC5 interface is provided by V2X sidelink communication, whereby UEs can communicate with each other directly rather than via the E-UTRAN. This communication mode is supported when the V2X UE is served by E-UTRAN but is outside of E-UTRA coverage. Only UEs authorised for V2X services can perform V2X sidelink communication.

In order for a V2X UE to access V2X services over LTE-Uu, application server and service-related information needs to be specified and provided to the V2X UE. Currently, 3GPP TS 23.285 does not specify the procedures for acquiring this information. Although 3GPP TS 23.285 does specify a V2X Control function for provisioning in general, this feature does not provide the needed information and is not expected to be pursued and/or supported in future specifications, such as for V2X services with the 5G system (e.g., 3GPP TS 23.287). Accordingly, there is a need for solutions that provide application service and services-related information to facilitate access to V2X services over LTE-Uu.

SUMMARY

Exemplary embodiments of the present disclosure include methods and/or procedures for V2X service discovery from a V2X application server (AS), in accordance with particular exemplary embodiments of the present disclosure. The exemplary method and/or procedure can be performed by a V2X user equipment (UE, e.g., wireless device, IoT device, modem, etc. or component thereof) operating in a radio access network (RAN), such as an LTE E-UTRAN.

The exemplary methods and/or procedures can include sending, to a first address associated with the V2X AS, a first discovery request for further address information, associated with the V2X AS, that facilitates discovery of V2X services available via unicast communication between the V2X UE and the RAN. In some embodiments, the first discovery request can also include an identifier of the V2X UE. In some embodiments, the first address can be an address of a configuration management server that comprises the V2X AS. In some embodiments, the first address can be preconfigured in the V2X UE.

It is noted that the present disclosure is directed to the concept that the methods facilitate the service discovery procedure.

It is noted that the service discovery request may comprise an identity of the V2X UE that sends the request to the V2X AS, and that the service discovery response may comprise a list of available V2X services as well as a mapping of the V2X services to V2X Application Server address.

The exemplary methods and/or procedures can also include receiving, from the V2X AS, a first discovery response comprising the requested further address information. In some embodiments, the first discovery request can be sent by a configuration management client that comprises the V2X UE, and the first discovery response can be received by the configuration management client. In some embodiments, the exemplary methods and/or procedures can also include receiving, from the V2X AS, a further message comprising identification of one or more V2X services available via unicast communication between the V2X UE and the RAN. The further message can also include information mapping the identified services to the further address information received in the first discovery response.

In some embodiments, the further message can be unsolicited (e.g., not requested) by the V2X UE. In other embodiments, the exemplary methods and/or procedures can also include sending a second discovery request, to the V2X AS, for V2X services available via the unicast communication. In such embodiments, the second discovery request can be based on the further address information, and the further message can be received in response the second discovery request. In some embodiments, the second discovery request can include an identifier of the V2X UE and/or one or more filtering criteria for services of interest to the V2X UE. In some embodiments, the second discovery request can be sent by, and the further message can be received by, a V2X application enabler (VAE) client that comprises the V2X UE.

Other exemplary embodiments include methods and/or procedures for facilitating service discovery by one or more V2X user equipment (UE), in accordance with particular exemplary embodiments of the present disclosure. These exemplary methods and/or procedures can be performed by a V2X application server (AS, or components thereof).

The exemplary methods and/or procedures can include receiving, at a first address associated with the V2X AS, a first discovery request for further address information, associated with the V2X AS, that facilitates discovery of V2X services available via unicast communication between a radio access network (RAN), such as an LTE E-UTRAN. In some embodiments, the first discovery request can also include an identifier of the V2X UE. In some embodiments, the first address can be an address of a configuration management server that comprises the V2X AS.

The exemplary methods and/or procedures can also include sending, to the V2X UE, a first discovery response comprising the requested further address information. In some embodiments, the first discovery request can be received by a configuration management server that comprises the V2X AS, and the first discovery response can be sent by the configuration management server.

In some embodiments, the exemplary methods and/or procedures can also include sending, to the V2X UE, a further message comprising identification of one or more V2X services available via unicast communication between the V2X UE and the RAN. The further message can also include information mapping the identified services to the further address information received in the first discovery response.

In some embodiments, the further message can be sent without request (e.g., unsolicited) by the V2X UE. In other embodiments, the exemplary methods and/or procedures can also include receiving a second discovery request, from the V2X UE, for V2X services available via the unicast communication. In such embodiments, the second discovery request can be based on the further address information, and the further message can be sent in response the second discovery request.

In some embodiments, the second discovery request can include an identifier of the V2X UE and/or one or more filtering criteria for services of interest to the V2X UE. In such embodiments, the one or more V2X services identified in the further message can be determined based on the one or more filtering criteria. In some embodiments, the second discovery request can be received by, and the further message can be sent by, a V2X application enabler (VAE) server that comprises the V2X AS.

Exemplary embodiments also include wireless devices (e.g., V2X UEs) or application servers (e.g., V2X AS) configured to perform operations corresponding to any of the above-described methods and/or procedures. Exemplary embodiments also include non-transitory, computer-readable media storing computer-executable instructions that, when executed by a processor comprising a wireless device or application server, configure the wireless device or application server to perform operations corresponding to any of the above-described methods and/or procedures.

BRIEF DESCRIPTION OF THE DRAWINGS

FIG. 1 shows a simplified architectural model for the V2X application layer as specified in 3GPP TS 23.285.

FIG. 2 shows a more detailed V2X application layer functional model.

FIGS. 14-17 are flow diagrams illustrating various exemplary methods and/or procedures implemented in a communication system, according to various exemplary embodiments of the present disclosure.

DETAILED DESCRIPTION

Exemplary embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Figure 3:
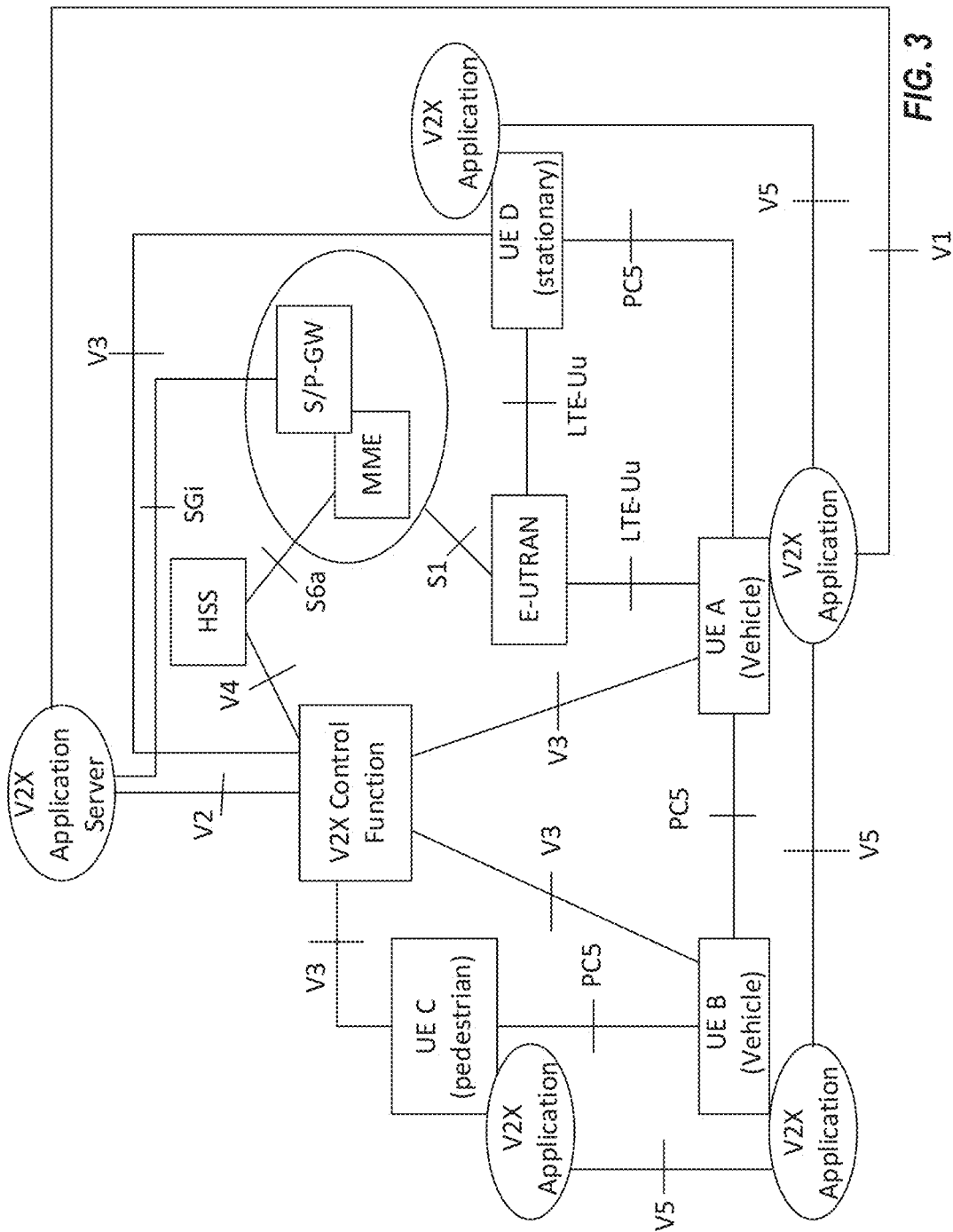
FIG. 3 shows an exemplary non-roaming architectural model for PC5 and LTE-Uu based V2X communications, as specified in 3GPP TS 23.285.

FIG. 3 shows an exemplary non-roaming architectural model for PC5 and LTE-Uu based V2X communications, as specified in 3GPP TS 23.285. In this exemplary architecture, there are four UEs, labelled A, B, C, and D, respectively. UEs A and D utilize the LTE-Uu interface to the E-UTRAN as well as a PC5 interface to each other. LTE-Uu operation can be unicast and/or broadcast (e.g., MBMS), and can be different for transmission and reception. For example, UE A (and/or D) can use MBMS for reception without using LTE-Uu for transmission. In addition, a UE may also receive V2X messages via LTE-Uu unicast downlink. UE B utilizes PC5 interfaces with both UE A and UE C, but neither UE B nor UE C utilize an LTE-Uu interface. Each of the UEs hosts a V2X application, with the respective V2X applications communicate via V5 interfaces, as also illustrated in FIGS. 1-2. Each of the UEs also has a V3 interface to the V2X Control function. In addition, the V2X application hosted by UE A has a V1 interface to the V2X Application Service, as also illustrated in FIGS. 1-2.

Figure 4:
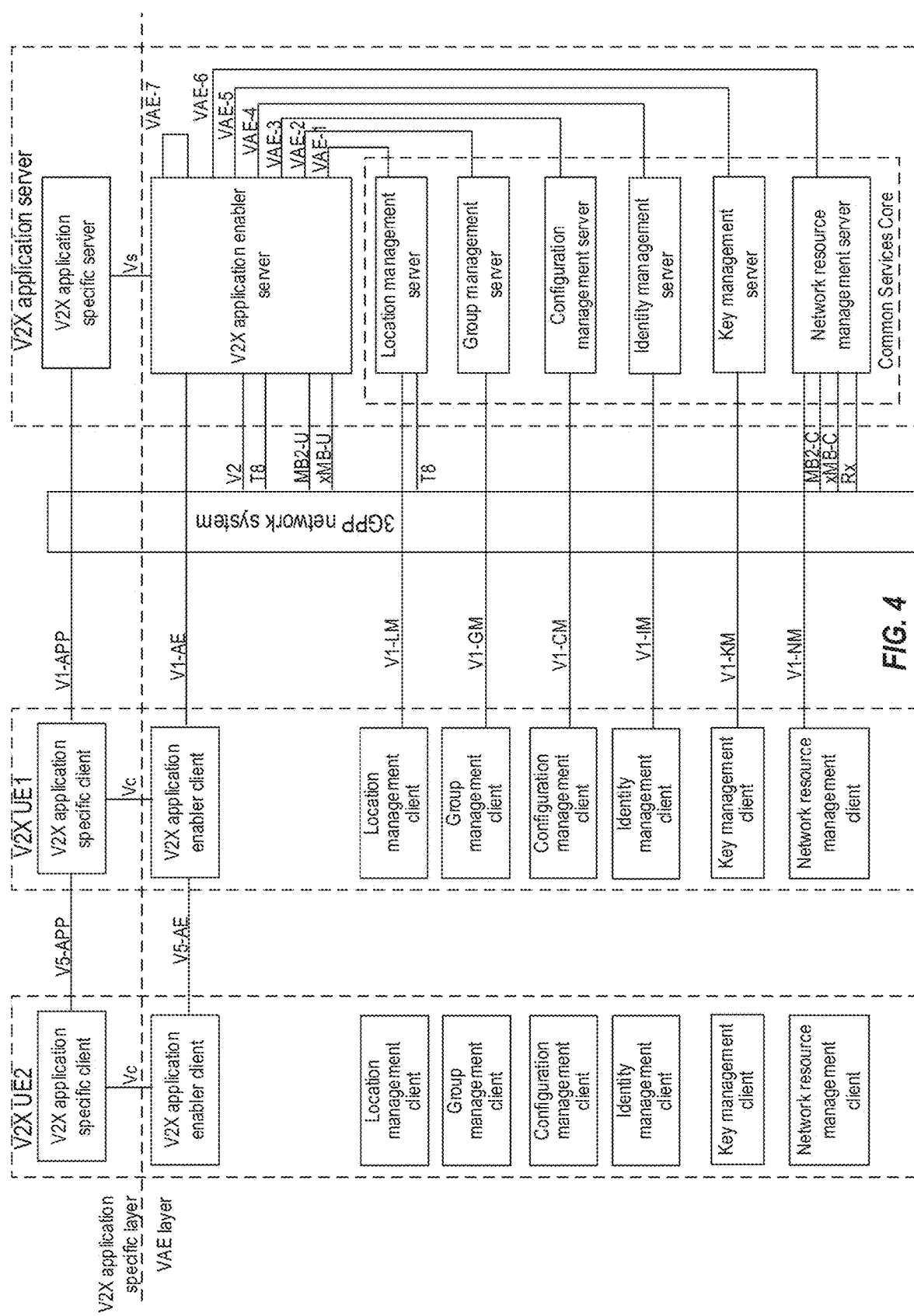
FIG. 4 shows an even more detailed architectural model for the V2X application layer, as specified in 3GPP TS 23.286.

FIG. 4 shows an even more detailed architectural model for V2X application layer communications over LTE-Uu and PC5, as specified in 3GPP TS 23.286. As mentioned above, the V2X application layer functional entities for the V2X UE and the V2X application server (AS) are grouped into the V2X application specific layer and the V2X application enabler (VAE) layer. The V2X application specific layer consists of the V2X application specific functionalities. The VAE layer offers the VAE capabilities to the V2X application specific layer. The VAE layer includes a common set of functions and reference points known as the common services core and the VAE server. The common services core includes functionalities for location management, group management, configuration management, identity management, key management, and network resource management.

The V2X application server consists of the VAE server, the common service functions' servers and the V2X application specific server. The VAE server provides the V2X application layer support functions to the V2X application specific server over Vs reference point. The V2X UEs consist of the VAE client, the common services core functions' clients and the V2X application specific client. The VAE client provides the V2X application layer support functions to the V2X application specific client over Vc reference point.

FIG. 4 shows two V2X UEs—UE1 and UE2—whose V2X applications communicate over the V5 interface. More specifically, the respective V2X application-specific clients of UEs 1 and 2 communicate over the V5-APP interface, while the V2x application enabler (VAE) clients communicate over the V5-AE interface. In addition, FIG. 4 shows that V2X UE1 also communicates with the V2X application server via the V1 interface. More specifically, UE1's V2X application specific client communicates with the V2X application-specific server over the V1-APP interface, while UE1's V2X AE client communicates with the V2X AE server over the V1-AE interface. In addition, both UE1 and UE2 include clients for the respective core services, with each of UE2's core service clients (e.g., for location management) communicating with the corresponding core service server over a service-specific portion of the V1 interface (e.g., V1-LM). In this manner, functions specific to each core service (e.g., location management functions) are supported by the interactions between the associated UE client (e.g., location management client) and the corresponding server (e.g., location management server) over the particular reference point and/or interface (e.g., V1-LM).

As briefly mentioned above, in order for a V2X UE to access V2X services over LTE-Uu, application server and service-related information needs to be specified and provided to the V2X UE. Currently, 3GPP TS 23.285 does not specify the procedures for acquiring this information. 3GPP TS 23.285 section 4.4.1.2.1 specifies that "[a]dditional information may be provisioned to the UE for the use of V2X communications over LTE-Uu reference point, e.g. for unicast or MBMS." Section 4.4.1.2.2, repeated below, discusses more specifics concerning this provisioning of configuration data for both MBMS and unicast V2X communications:

4.4.1.2.2 Policy/Parameter Provisioning

The following information may be configured in V2X Control Function and optionally provisioned to the UE for V2X communications over LTE-Uu reference point:

1) PLMNs in which the UE is authorized to use MBMS based V2X communication.

Corresponding V2X USD(s) for receiving MBMS based V2X traffic in the PLMN. The V2X USD(s) may be obtained through the V2 reference point from the V2X Application Server.

NOTE: The V2 reference point procedure is not specified in this Release.

2) V2X Application Server address information.

List of FQDNs or IP addresses of the V2X Application Servers, associated with served geographical area information and list of PLMNs that the configuration applies to.

3) V2X Application Sever discovery using MBMS.

List of PLMNs and corresponding V2X Server USDs for receiving V2X Application Server information via MBMS.

4) Mapping of the V2X services, e.g. PSID or ITS-AIDs of the V2X application to:

V2X Application Server address (consisting of IP address/FQDN and UDP port) for unicast;

V2X USD for MBMS.

Information of the V2X USD is described in clause 4.4.7.2 and information of the V2X Server USD is described in clause 4.4.7.3.

Although 3GPP TS 23.285 (e.g., section 4.4.1.2.2 above) mentions using V2X Control function for provisioning in general, this feature does not provide the needed information and is not expected to be pursued and/or supported in future specifications, such as for V2X services with the 5G system (e.g., 3GPP TS 23.287). Accordingly, there is a need for solutions that provide application service and services-related information to facilitate access to V2X services over LTE-Uu. Put a different way, there is a need for techniques that facilitate a V2X UE to acquire V2X application server and V2X service discovery data from the V2X application server, so that the V2X UE can register and receive V2X/ITS-related messages.

Exemplary embodiments of the present disclosure address these and other problems, insufficiencies, and/or issues. According to exemplary embodiments, before registering and receiving V2X messages, a V2X UE can be made aware of the capabilities of V2X application servers (e.g., the served geographical area) and the V2X services that are available (e.g., services and corresponding protocol versions). These capabilities can be provided as VAE capabilities. In this manner, the V2X UE can discover the available V2X services and the corresponding V2X application servers.

Figure 5:
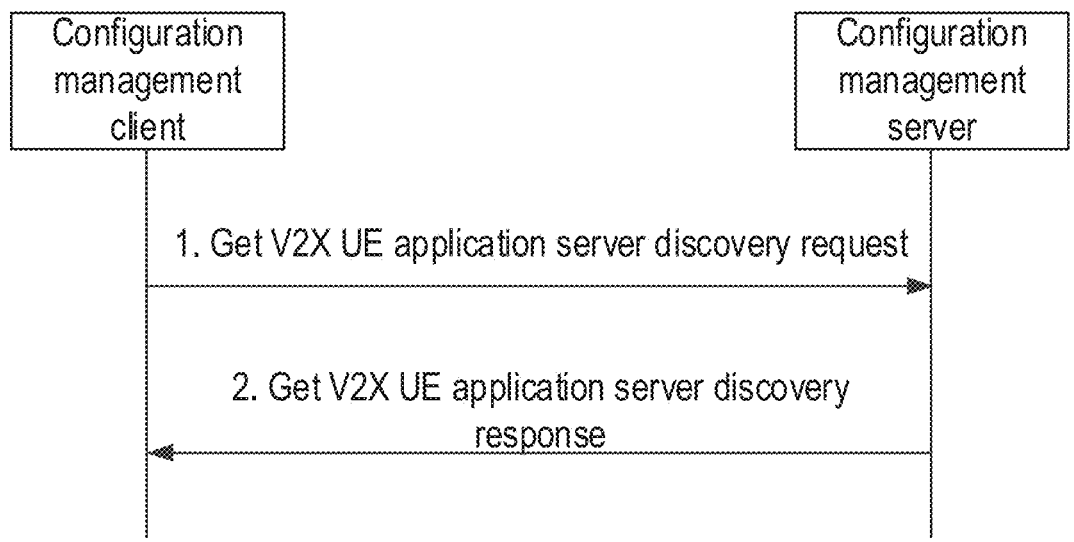
FIG. 5 shows an information flow diagram corresponding to an exemplary procedure for tracking geographical location, according to various exemplary embodiments of the present disclosure.
Figure 6:
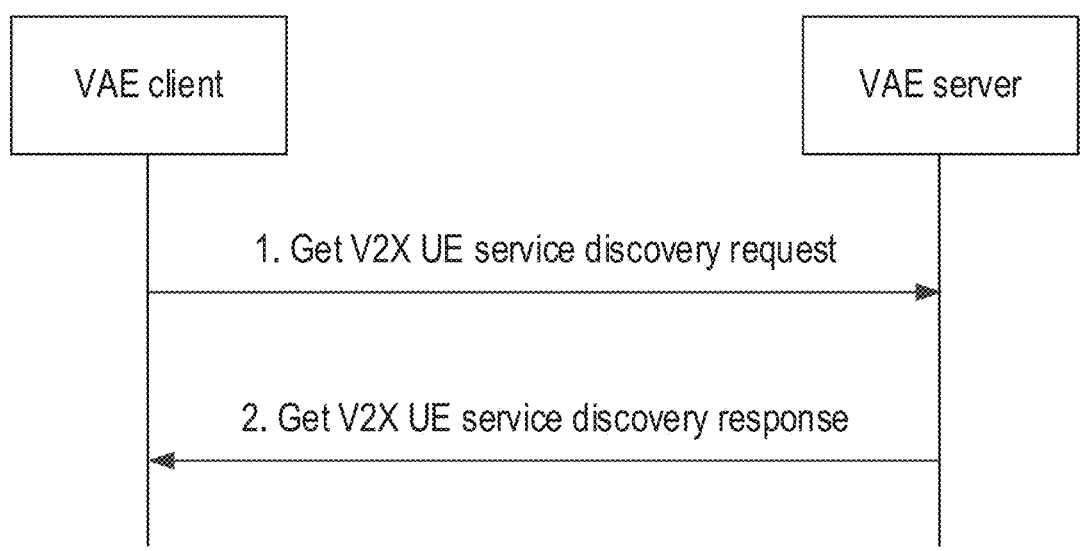
FIG. 6 shows an information flow diagram corresponding to an exemplary procedure for message delivery to target geographical areas from a VAE server, according to various exemplary embodiments of the present disclosure.

The following text describes various exemplary embodiments of procedures for V2X application server discovery and V2X service discovery. Such text can be included, e.g., in a 3GPP technical specification (TS) and/or technical report (TR). FIGS. 5 and 6 show two exemplary information flow diagrams corresponding to the procedures for V2X application server discovery and V2x service discovery, respectively.

9.X V2X Application Server discovery

9.X.1 General

The VAE capabilities provides support for V2X application server discovery (e.g. available V2X Application Servers) for unicast V2X communication over LTE-Uu.

9.X.2 Information flows

Table 9.X.2.1-1 describes the information flow get V2X UE application server discovery request from the configuration management client to the configuration management server.

TABLE 9.X.2.1-1

Get V2X UE application server discovery request

| Information element | Status | Description |
| --- | --- | --- |
| V2X UE ID | M | Identity of the V2X UE requesting the V2X application server discovery information. |

Table 9.X.2.2-1 describes the information flow get V2X UE application server discovery response from the configuration management server to the configuration management client.

TABLE 9.X.2.2-1

Get V2X UE application server discovery response

| Information element | Status | Description |
| --- | --- | --- |
| Result | M | Indicates the success or failure of getting the application server information |
| V2X UE application server information | O (NOTE) | The V2X UE application server discovery information includes: V2X Application Server address information as specified in 3GPP TS 23.285 [5] Transport port |

NOTE:
If the Result information element indicates failure then V2X UE application server information element is not included.

9.X.3 V2X UE application server discovery

The V2X UE is pre-configured with the address of the configuration management server. The procedure for V2X UE obtaining the V2X UE application server discovery information is illustrated in FIG. 5.

Pre-condition: The V2X UE has the secure access to the configuration management server.

Operations:

1. The configuration management client sends a Get V2X UE application server discovery request to the configuration management server for obtaining V2X UE application server information.

2. The configuration management server sends a Get V2X UE application server discovery response to the configuration management client. This message carries the V2X UE application server information.

9.Y V2X Service Discovery

9.Y.1 General

The VAE capabilities provides support for service discovery (e.g. available V2X services) for unicast V2X communication over LTE-Uu.

9.Y.2 Information Flows

Table 9.Y.2.1-1 describes the information flow get V2X UE service discovery request from the VAE client to the VAE server.

TABLE 9.Y.2.1-1

| Get V2X UE service discovery request | | |
|---|---|---|
| Information element | Status | Description |
| V2X UE ID | M | Identity of the V2X UE requesting the service discovery information. |

Table 9.Y.2.2-1 describes the information flow get V2X UE service discovery response from the VAE server to the VAE client.

TABLE 9.Y.2.2-1

| Get V2X UE service discovery response | | |
|---|---|---|
| Information element | Status | Description |
| Result | M | Indicates the success or failure of getting the service discovery information |
| V2X UE service discovery information | O (NOTE) | The V2X UE service discovery data includes: List of available V2X services including protocol versions of the V2X services Mapping of the V2X services to V2X Application Server address as specified in 3GPP TS 23.285 [5] |

NOTE:
If the Result information element indicates failure then V2X UE service discovery information element is not included.

9.Y.3 V2X UE service discovery

The V2X UE has already acquired V2X application server information and is able to communicate with the V2X application server to receive service-related information.

As explained above, a V2X AS and a V2X UE can communicate over the V1 interface or reference point, which supports both unicast and multicast delivery modes. As also explained above, the V1 interface includes the V1-AE interface between VAE server and VAE client in the V2X UE, and the V1-AE interface supports both unicast and multicast messages. Accordingly, the VAE server can send the Get V2X service discovery response to the VAE client as a unicast message over the V1-AE interface. The procedure for V2X UE obtaining the V2X UE service discovery information is illustrated in FIG. 6.

Pre-condition: The V2X UE has discovered the VAE server.

Operations:

1. The VAE client sends a Get V2X UE service discovery request to the VAE server for obtaining V2X UE service discovery information.

2. The VAE server sends a Get V2X UE service discovery response to the VAE client. This message carries the V2X UE service discovery information.

In some embodiments, the V2X Application Server address received by the V2X UE (e.g., in Get V2X UE application server discovery response) can include one or more fully-qualified domain names (FQDNs) and/or one or more IP addresses, associated with the V2X application server, that are usable for communication with the V2X application server over the LTE-Uu interface (e.g., via the E-UTRAN). In some embodiments, the V2X Application Server address received by the UE can also identify a served geographical area and/or one or more public land mobile networks (PLMNs) associated with the FQDNs and/or IP addresses. As indicated above, the Get V2X UE application server discovery response can also include the identity of a transport port within the V2X application server.

In some embodiments, in the Get V2X UE service discovery request, the V2X UE can indicate some conditions and/or filtering criteria for the services of interest to the V2X UE. For example, the V2X UE can indicate specific services, specific areas for services, and/or other criteria related to personalization of services. In some embodiments, instead of or in addition to the request/response shown in FIG. 6, the VAE server can use a push mechanism to provide the available V2X services to the V2X UEs. This can be done using LTE MBMS, LTE unicast, short-range broadcast, or any other mechanism available.

After receiving the service discovery information (e.g., by request/response or by push), the V2X UE can register for one or more of the discovered services. In some embodiments, after service registration, the VAE server can send further service updates to registered V2X UEs. These updates can be for the registered services, for all services previously reported to the UE, for all services offered by the VAE server, for newly-offered services since the V2X UE's service discovery, etc. Depending on the particular content of the updates, the VAE server can provide these updates via LTE MBMS, LTE unicast, short-range broadcast, or any mechanism appropriate the particular content.

Figure 7:
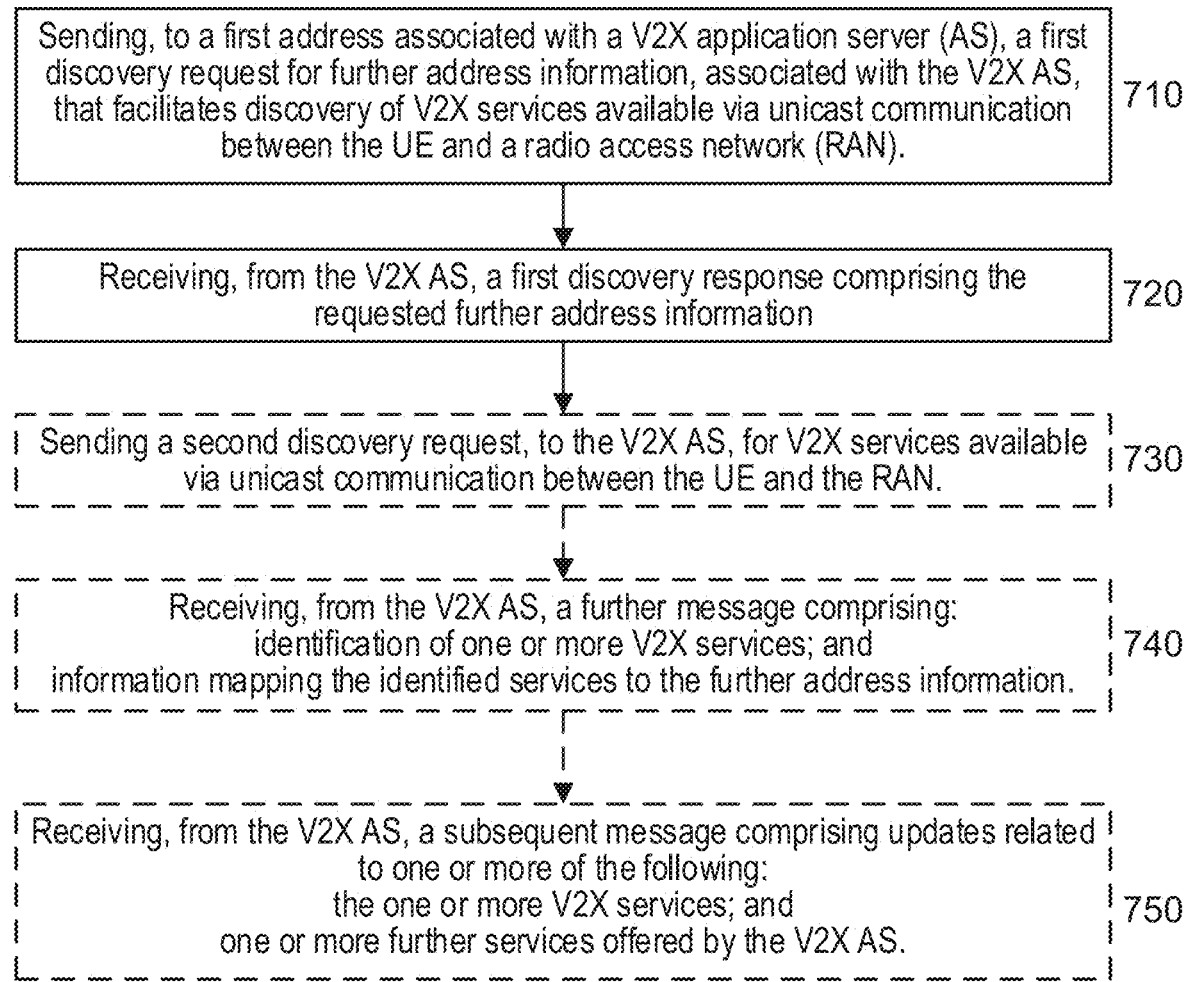
FIG. 7 is a flow diagram illustrating exemplary methods and/or procedures performed by a V2X user equipment (UE, or components thereof), according to various exemplary embodiments of the present disclosure.
Figure 8:
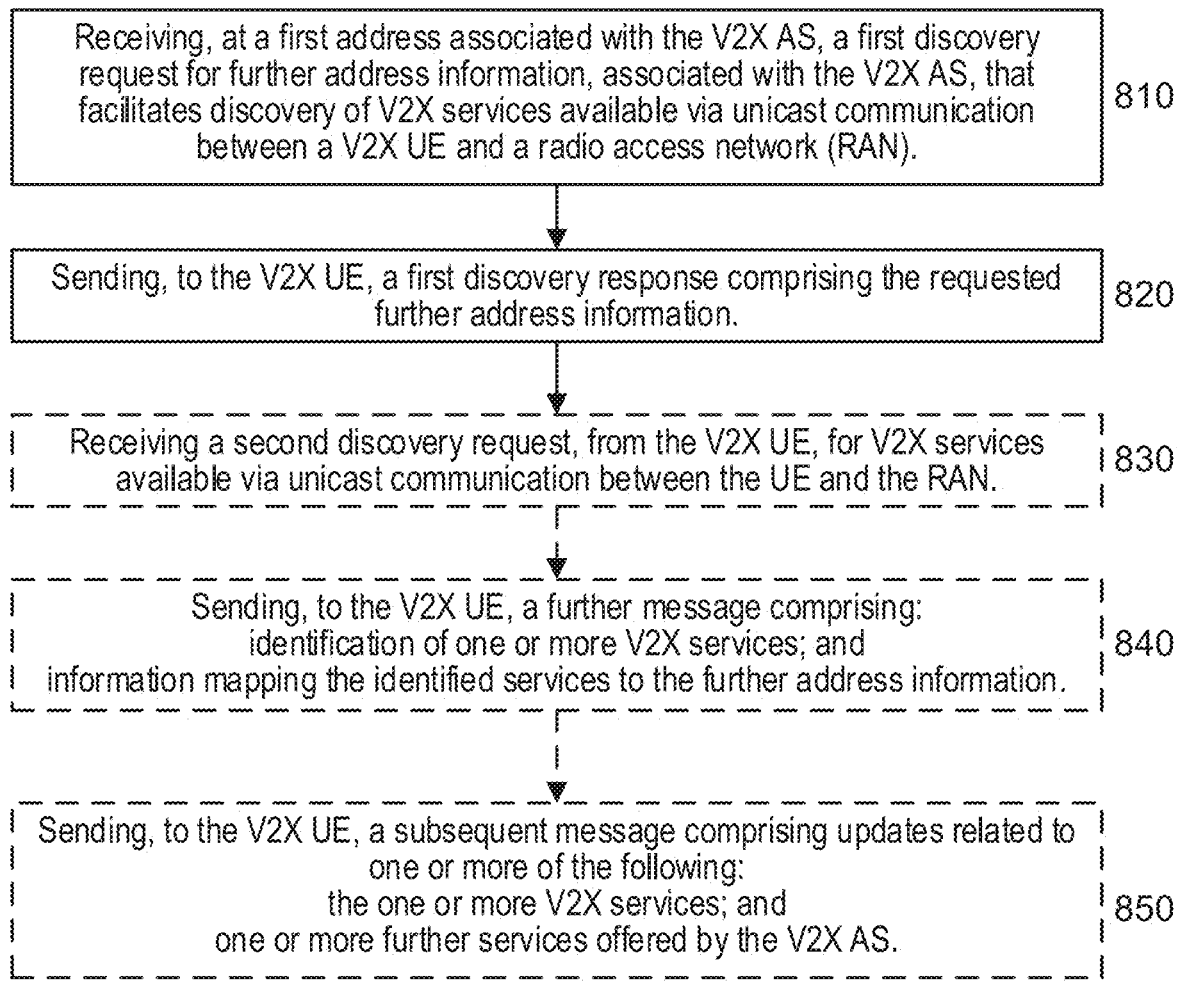
FIG. 8 is a flow diagram illustrating exemplary methods and/or procedures performed by a V2X application server (AS, or components thereof), according to various exemplary embodiments of the present disclosure.

FIG. 7 illustrates an exemplary method and/or procedure for V2X service discovery from a V2X application server (AS), in accordance with particular exemplary embodiments of the present disclosure. The exemplary method and/or procedure can be performed by a V2X user equipment (UE, e.g., wireless device, IoT device, modem, etc. or component thereof) operating in a radio access network (RAN), such as an LTE E-UTRAN. Although the exemplary method and/or procedure is illustrated by blocks in a particular order, this order is exemplary and the operations corresponding to the blocks can be performed in different orders, and can be combined and/or divided into blocks having different functionality than shown in FIG. 7. Furthermore, the exemplary method and/or procedure shown in FIG. 7 can be complementary to the exemplary method and/or procedure illustrated in FIG. 8. In other words, exemplary methods and/or procedures shown in FIGS. 7-8 are capable of being used cooperatively to provide benefits, advantages, and/or solutions to problems described hereinabove. Optional blocks and/or operations are indicated by dashed lines.

The exemplary method and/or procedure can include the operations of block 710, where the V2X UE can send, to a first address associated with the V2X AS, a first discovery request for further address information, associated with the V2X AS, that facilitates discovery of V2X services available via unicast communication between the V2X UE and the RAN. In some embodiments, the first discovery request can also include an identifier of the V2X UE. In some embodiments, the first address can be an address of a configuration management server that comprises the V2X AS. In some embodiments, the first address can be pre-configured in the V2X UE.

The exemplary method and/or procedure can also include the operations of block 720, where the V2X UE can receive, from the V2X AS, a first discovery response comprising the requested further address information. In some embodiments, the first discovery request can be sent by a configuration management client that comprises the V2X UE, and the first discovery response can be received by the configuration management client. In some embodiments, the further address information associated with the V2X AS can include one or more of the following: a transport port; one or more fully-qualified domain names (FQDNs); one or more Internet Protocol (IP) addresses; an identifier of an associated geographical area; and identifiers of one or more associated public land mobile networks (PLMNs).

In some embodiments, the exemplary method and/or procedure can also include the operations of block 740, where the V2X UE can receive, from the V2X AS, a further message comprising identification of one or more V2X services available via unicast communication between the V2X UE and the RAN. The further message can also include information mapping the identified services to the further address information received in the first discovery response. In some embodiments, the identification of the one or more services can also include identification of respective protocol versions of the one or more services.

In some embodiments, the further message can be unsolicited (e.g., not requested) by the V2X UE. In other embodiments, the exemplary method and/or procedure can also include the operations of block 730, where the V2X UE can send a second discovery request, to the V2X AS, for V2X services available via the unicast communication. In such embodiments, the second discovery request can be based on the further address information, and the further message can be received (e.g., in operation 740) in response the second discovery request. In some embodiments, the second discovery request can include an identifier of the V2X UE and/or one or more filtering criteria for services of interest to the V2X UE. In some embodiments, the second discovery request can be sent by, and the further message can be received by, a V2X application enabler (VAE) client that comprises the V2X UE.

In some embodiments, the exemplary method and/or procedure can also include the operations of block 750, where the V2X UE can receive, from the V2X AS, a subsequent message comprising updates related to the one or more services identified in the further message, and/or to one or more further services associated with the V2X AS but not identified in the further message. In such embodiments, the subsequent message can be received via one of the following: unicast from the RAN, broadcast from the RAN, and broadcast from another V2X UE.

FIG. 8 illustrates an exemplary method and/or procedure for facilitating service discovery by one or more V2X user equipment (UE), in accordance with particular exemplary embodiments of the present disclosure. The exemplary method and/or procedure can be performed by a V2X application server (AS, or components thereof) such as described in relation to other figures herein. Although the exemplary method and/or procedure is illustrated in FIG. 8 by blocks in a particular order, this order is exemplary and the operations corresponding to the blocks can be performed in different orders, and can be combined and/or divided into blocks having different functionality than shown in FIG. 8. Furthermore, the exemplary method and/or procedure shown in FIG. 8 can be complementary to exemplary methods and/or procedures illustrated in FIG. 7. In other words, exemplary methods and/or procedures shown in FIGS. 7-8 are capable of being used cooperatively to provide benefits, advantages, and/or solutions to problems described hereinabove. Optional blocks and/or operations are indicated by dashed lines.

The exemplary method and/or procedure can include the operations of block 810, where the V2X AS can receive, at a first address associated with the V2X AS, a first discovery request for further address information, associated with the V2X AS, that facilitates discovery of V2X services available via unicast communication between a radio access network (RAN), such as an LTE E-UTRAN. In some embodiments, the first discovery request can also include an identifier of the V2X UE. In some embodiments, the first address can be an address of a configuration management server that comprises the V2X AS. In some embodiments, the first address can be pre-configured in the V2X UE.

The exemplary method and/or procedure can also include the operations of block 820, where the V2X AS can send, to the V2X UE, a first discovery response comprising the requested further address information.

In some embodiments, the first discovery request can be received by a configuration management server that comprises the V2X AS, and the first discovery response can be sent by the configuration management server. In some embodiments, the further address information associated with the V2X AS can include one or more of the following: a transport port; one or more fully-qualified domain names (FQDNs); one or more Internet Protocol (IP) addresses; an identifier of an associated geographical area; and identifiers of one or more associated public land mobile networks (PLMNs).

In some embodiments, the exemplary method and/or procedure can also include the operations of block 840, where the V2X AS can send, to the V2X UE, a further message comprising identification of one or more V2X services available via unicast communication between the V2X UE and the RAN. The further message can also include information mapping the identified services to the further address information received in the first discovery response.

In some embodiments, the identification of the one or more services can also include identification of respective protocol versions of the one or more services.

In some embodiments, the further message can be sent without request (e.g., unsolicited) by the V2X UE. In other embodiments, the exemplary method and/or procedure can also include the operations of block 830, where the V2X AS can receive a second discovery request, from the V2X UE, for V2X services available via the unicast communication. In such embodiments, the second discovery request can be based on the further address information, and the further message can be sent (e.g., in operation 840) in response the second discovery request.

In some embodiments, the second discovery request can include an identifier of the V2X UE and/or one or more filtering criteria for services of interest to the V2X UE. In such embodiments, the one or more V2X services identified in the further message can be determined based on the one or more filtering criteria. In some embodiments, the second discovery request can be received by, and the further message can be sent by, a V2X application enabler (VAE) server that comprises the V2X AS.

In some embodiments, the exemplary method and/or procedure can also include the operations of block 850, where the V2X AS can send, to the V2X UE, a subsequent message comprising updates related to the one or more services identified in the further message, and/or to one or more further services associated with the V2X AS but not identified in the further message. In such embodiments, the subsequent message can be sent to the V2X UE via one of the following: unicast via the RAN, broadcast via the RAN, and broadcast via another V2X UE.

Figure 9:
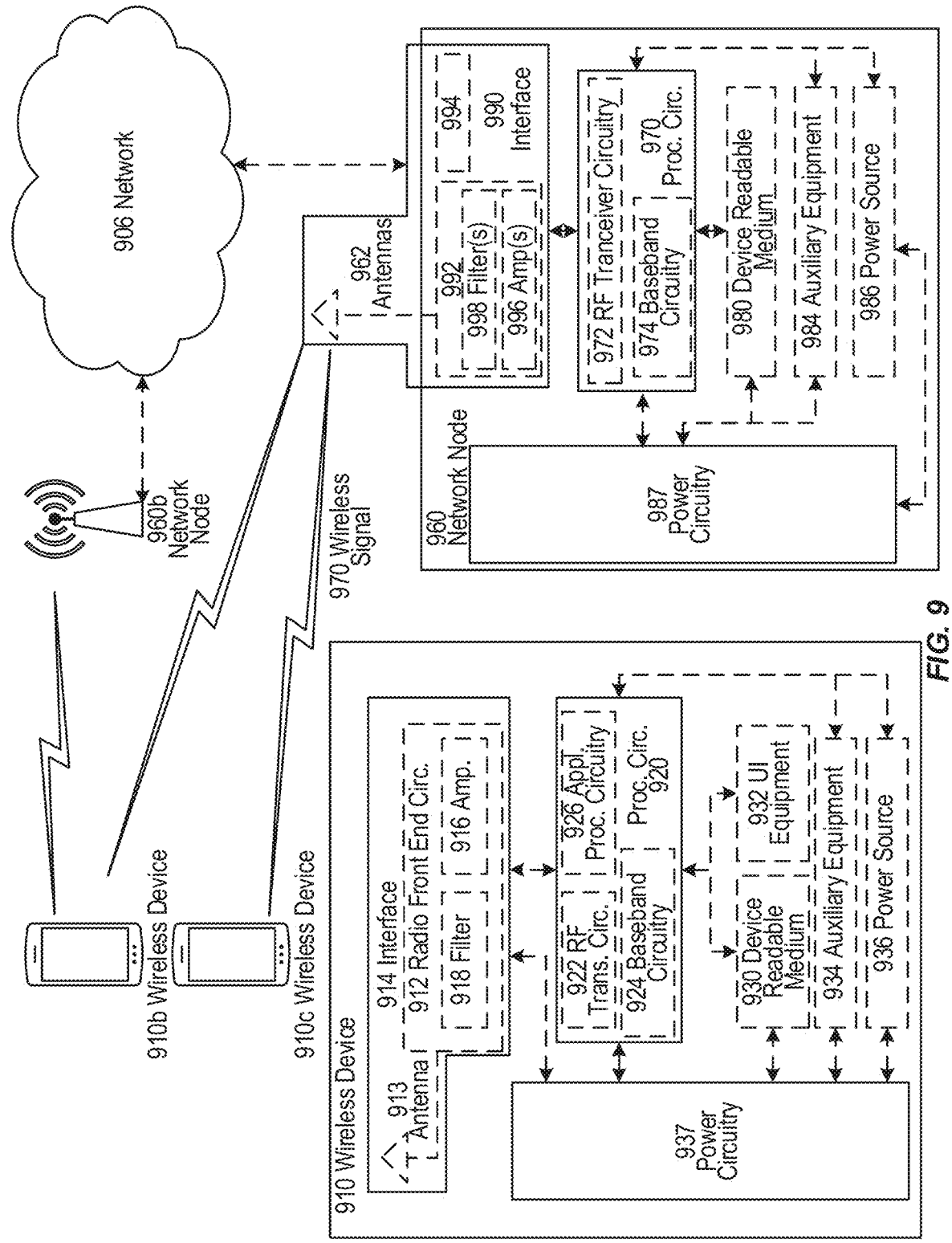
FIG. 9 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*.

In practice, a wireless network can further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 960 are depicted as single boxes located within a larger box, or nested within multiple boxes, in practice, a network node can comprise multiple different physical components that make up a single illustrated component (e.g., device readable medium 980 can comprise multiple separate hard drives as well as multiple RAM modules).

Similarly, network node 960 can be composed of multiple physically separate components (e.g., a NodeB component and a RNC component, or a BTS component and a BSC component, etc.), which can each have their own respective components. In certain scenarios in which network node 960 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 960 can be configured to support multiple radio access technologies (RATs). In such embodiments, some components can be duplicated (e.g., separate device readable medium 980 for the different RATs) and some components can be reused (e.g., the same antenna 962 can be shared by the RATs). Network node 960 can also include multiple sets of the various illustrated components for different wireless technologies integrated into network node 960, such as, for example, GSM, WCDMA, LTE, NR, WiFi, or Bluetooth wireless technologies. These wireless technologies can be integrated into the same or different chip or set of chips and other components within network node 960.

Processing circuitry 970 can be configured to perform any determining, calculating, or similar operations (e.g., certain obtaining operations) described herein as being provided by a network node. These operations performed by processing circuitry 970 can include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 can execute instructions stored in device readable medium 980 or in memory within processing circuitry 970. Such functionality can include providing any of the various wireless features, functions, or benefits discussed herein. In some embodiments, processing circuitry 970 can include a system on a chip (SOC).

In some embodiments, processing circuitry 970 can include one or more of radio frequency (RF) transceiver circuitry 972 and baseband processing circuitry 974. In some embodiments, radio frequency (RF) transceiver circuitry 972 and baseband processing circuitry 974 can be on separate chips (or sets of chips), boards, or units, such as radio units and digital units. In alternative embodiments, part or all of RF transceiver circuitry 972 and baseband processing circuitry 974 can be on the same chip or set of chips, boards, or units.

In certain embodiments, some or all of the functionality described herein as being provided by a network node, base station, eNB or other such network device can be performed by processing circuitry 970 executing instructions stored on device readable medium 980 or memory within processing circuitry 970. In alternative embodiments, some or all of the functionality can be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 970. Device readable medium 980 can store any suitable instructions, data or information, including a computer program, software, an application including one or more of logic, rules, code, tables, etc. and/or other instructions capable of being executed by processing circuitry 970 and, utilized by network node 960. Device readable medium 980 can be used to store any calculations made by processing circuitry 970 and/or any data received via interface 990. In some embodiments, processing circuitry 970 and device readable medium 980 can be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that can be coupled to, or in certain embodiments a part of, antenna 962. Radio front end circuitry 992 comprises filters 998 and amplifiers 996. Radio front end circuitry 992 can be connected to antenna 962 and processing circuitry 970. Radio front end circuitry can be configured to condition signals communicated between antenna 962 and processing circuitry 970. Radio front end circuitry 992 can receive digital data that is to be sent out to other network nodes or WDs via a wireless connection. Radio front end circuitry 992 can convert the digital data into a radio signal having the appropriate channel and bandwidth parameters using a combination of filters 998 and/or amplifiers 996. The radio signal can then be transmitted via antenna 962. Similarly, when receiving data, antenna 962 can collect radio signals which are then converted into digital data by radio front end circuitry 992. The digital data can be passed to processing circuitry 970. In other embodiments, the interface can comprise different components and/or different combinations of components.

In certain alternative embodiments, network node 960 may not include separate radio front end circuitry 992, instead, processing circuitry 970 can comprise radio front end circuitry and can be connected to antenna 962 without separate radio front end circuitry 992. Similarly, in some embodiments, all or some of RF transceiver circuitry 972 can be considered a part of interface 990. In still other embodiments, interface 990 can include one or more ports or terminals 994, radio front end circuitry 992, and RF transceiver circuitry 972, as part of a radio unit (not shown), and interface 990 can communicate with baseband processing circuitry 974, which is part of a digital unit (not shown).

Antenna 962 can include one or more antennas, or antenna arrays, configured to send and/or receive wireless signals. Antenna 962 can be coupled to radio front end circuitry 990 and can be any type of antenna capable of transmitting and receiving data and/or signals wirelessly. In some embodiments, antenna 962 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 962 can be separate from network node 960 and can be connectable to network node 960 through an interface or port.

Antenna 962, interface 990, and/or processing circuitry 970 can be configured to perform any receiving operations and/or certain obtaining operations described herein as being performed by a network node. Any information, data and/or signals can be received from a wireless device, another network node and/or any other network equipment. Similarly, antenna 962, interface 990, and/or processing circuitry 970 can be configured to perform any transmitting operations described herein as being performed by a network node. Any information, data and/or signals can be transmitted to a wireless device, another network node and/or any other network equipment.

Power circuitry 987 can comprise, or be coupled to, power management circuitry and can be configured to supply the components of network node 960 with power for performing the functionality described herein. Power circuitry 987 can receive power from power source 986. Power source 986 and/or power circuitry 987 can be configured to provide power to the various components of network node 960 in a form suitable for the respective components (e.g., at a voltage and current level needed for each respective component). Power source 986 can either be included in, or external to, power circuitry 987 and/or network node 960. For example, network node 960 can be connectable to an external power source (e.g., an electricity outlet) via an input circuitry or interface such as an electrical cable, whereby the external power source supplies power to power circuitry 987. As a further example, power source 986 can comprise a source of power in the form of a battery or battery pack which is connected to, or integrated in, power circuitry 987. The battery can provide backup power should the external power source fail. Other types of power sources, such as photovoltaic devices, can also be used.

Alternative embodiments of network node 960 can include additional components beyond those shown in FIG. 9 that can be responsible for providing certain aspects of the network node's functionality, including any of the functionality described herein and/or any functionality necessary to support the subject matter described herein.

For example, network node 960 can include user interface equipment to allow and/or facilitate input of information into network node 960 and to allow and/or facilitate output of information from network node 960. This can allow and/or facilitate a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD can be used interchangeably herein with user equipment (UE). Communicating wirelessly can involve transmitting and/or receiving wireless signals using electromagnetic waves, radio waves, infrared waves, and/or other types of signals suitable for conveying information through air. In some embodiments, a WD can be configured to transmit and/or receive information without direct human interaction. For instance, a WD can be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc..

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements, and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 can include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies can be integrated into the same or different chips or set of chips as other components within WD 910.

Antenna 911 can include one or more antennas or antenna arrays, configured to send and/or receive wireless signals, and is connected to interface 914. In certain alternative embodiments, antenna 911 can be separate from WD 910 and be connectable to WD 910 through an interface or port. Antenna 911, interface 914, and/or processing circuitry 920 can be configured to perform any receiving or transmitting operations described herein as being performed by a WD. Any information, data and/or signals can be received from a network node and/or another WD. In some embodiments, radio front end circuitry and/or antenna 911 can be considered an interface.

As illustrated, interface 914 comprises radio front end circuitry 912 and antenna 911. Radio front end circuitry 912 comprise one or more filters 918 and amplifiers 916. Radio front end circuitry 914 is connected to antenna 911 and processing circuitry 920, and can be configured to condition signals communicated between antenna 911 and processing circuitry 920. Radio front end circuitry 912 can be coupled to or a part of antenna 911. In some embodiments, WD 910 may not include separate radio front end circuitry 912; rather, processing circuitry 920 can comprise radio front end circuitry and can be connected to antenna 911. Similarly, in some embodiments, some or all of RF transceiver circuitry 922 can be considered a part of interface 914. Radio front end circuitry 912 can receive digital data that is to be sent out to other network nodes or WDs via a wireless connection. Radio front end circuitry 912 can convert the digital data into a radio signal having the appropriate channel and bandwidth parameters using a combination of filters 918 and/or amplifiers 916. The radio signal can then be transmitted via antenna 911. Similarly, when receiving data, antenna 911 can collect radio signals which are then converted into digital data by radio front end circuitry 912. The digital data can be passed to processing circuitry 920. In other embodiments, the interface can comprise different components and/or different combinations of components.

Processing circuitry 920 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality can include providing any of the various wireless features or benefits discussed herein. For example, processing circuitry 920 can execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry can comprise different components and/or different combinations of components. In certain embodiments processing circuitry 920 of WD 910 can comprise a SOC. In some embodiments, RF transceiver circuitry 922, baseband processing circuitry 924, and application processing circuitry 926 can be on separate chips or sets of chips. In alternative embodiments, part or all of baseband processing circuitry 924 and application processing circuitry 926 can be combined into one chip or set of chips, and RF transceiver circuitry 922 can be on a separate chip or set of chips. In still alternative embodiments, part or all of RF transceiver circuitry 922 and baseband processing circuitry 924 can be on the same chip or set of chips, and application processing circuitry 926 can be on a separate chip or set of chips. In yet other alternative embodiments, part or all of RF transceiver circuitry 922, baseband processing circuitry 924, and application processing circuitry 926 can be combined in the same chip or set of chips. In some embodiments, RF transceiver circuitry 922 can be a part of interface 914. RF transceiver circuitry 922 can condition RF signals for processing circuitry 920.

In certain embodiments, some or all of the functionality described herein as being performed by a WD can be provided by processing circuitry 920 executing instructions stored on device readable medium 930, which in certain embodiments can be a computer-readable storage medium. In alternative embodiments, some or all of the functionality can be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 can be configured to perform any determining, calculating, or similar operations (e.g., certain obtaining operations) described herein as being performed by a WD. These operations, as performed by processing circuitry 920, can include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 can be operable to store a computer program, software, an application including one or more of logic, rules, code, tables, etc. and/or other instructions capable of being executed by processing circuitry 920. Device readable medium 930 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 920. In some embodiments, processing circuitry 920 and device readable medium 930 can be considered to be integrated.

User interface equipment 932 can include components that allow and/or facilitate a human user to interact with WD 910. Such interaction can be of many forms, such as visual, audial, tactile, etc. User interface equipment 932 can be operable to produce output to the user and to allow and/or facilitate the user to provide input to WD 910. The type of interaction can vary depending on the type of user interface equipment 932 installed in WD 910. For example, if WD 910 is a smart phone, the interaction can be via a touch screen; if WD 910 is a smart meter, the interaction can be through a screen that provides usage (e.g., the number of gallons used) or a speaker that provides an audible alert (e.g., if smoke is detected). User interface equipment 932 can include input interfaces, devices and circuits, and output interfaces, devices and circuits. User interface equipment 932 can be configured to allow and/or facilitate input of information into WD 910, and is connected to processing circuitry 920 to allow and/or facilitate processing circuitry 920 to process the input information. User interface equipment 932 can include, for example, a microphone, a proximity or other sensor, keys/buttons, a touch display, one or more cameras, a USB port, or other input circuitry. User interface equipment 932 is also configured to allow and/or facilitate output of information from WD 910, and to allow and/or facilitate processing circuitry 920 to output information from WD 910. User interface equipment 932 can include, for example, a speaker, a display, vibrating circuitry, a USB port, a headphone interface, or other output circuitry. Using one or more input and output interfaces, devices, and circuits, of user interface equipment 932, WD 910 can communicate with end users and/or the wireless network, and allow and/or facilitate them to benefit from the functionality described herein.

Auxiliary equipment 934 is operable to provide more specific functionality which may not be generally performed by WDs. This can comprise specialized sensors for doing measurements for various purposes, interfaces for additional types of communication such as wired communications etc. The inclusion and type of components of auxiliary equipment 934 can vary depending on the embodiment and/or scenario.

Power source 936 can, in some embodiments, be in the form of a battery or battery pack. Other types of power sources, such as an external power source (e.g., an electricity outlet), photovoltaic devices or power cells, can also be used. WD 910 can further comprise power circuitry 937 for delivering power from power source 936 to the various parts of WD 910 which need power from power source 936 to carry out any functionality described or indicated herein.

Power circuitry 937 can in certain embodiments comprise power management circuitry. Power circuitry 937 can additionally or alternatively be operable to receive power from an external power source; in which case WD 910 can be connectable to the external power source (such as an electricity outlet) via input circuitry or an interface such as an electrical power cable. Power circuitry 937 can also in certain embodiments be operable to deliver power from an external power source to power source 936. This can be, for example, for the charging of power source 936. Power circuitry 937 can perform any converting or other modification to the power from power source 936 to make it suitable for supply to the respective components of WD 910.

Figure 10:
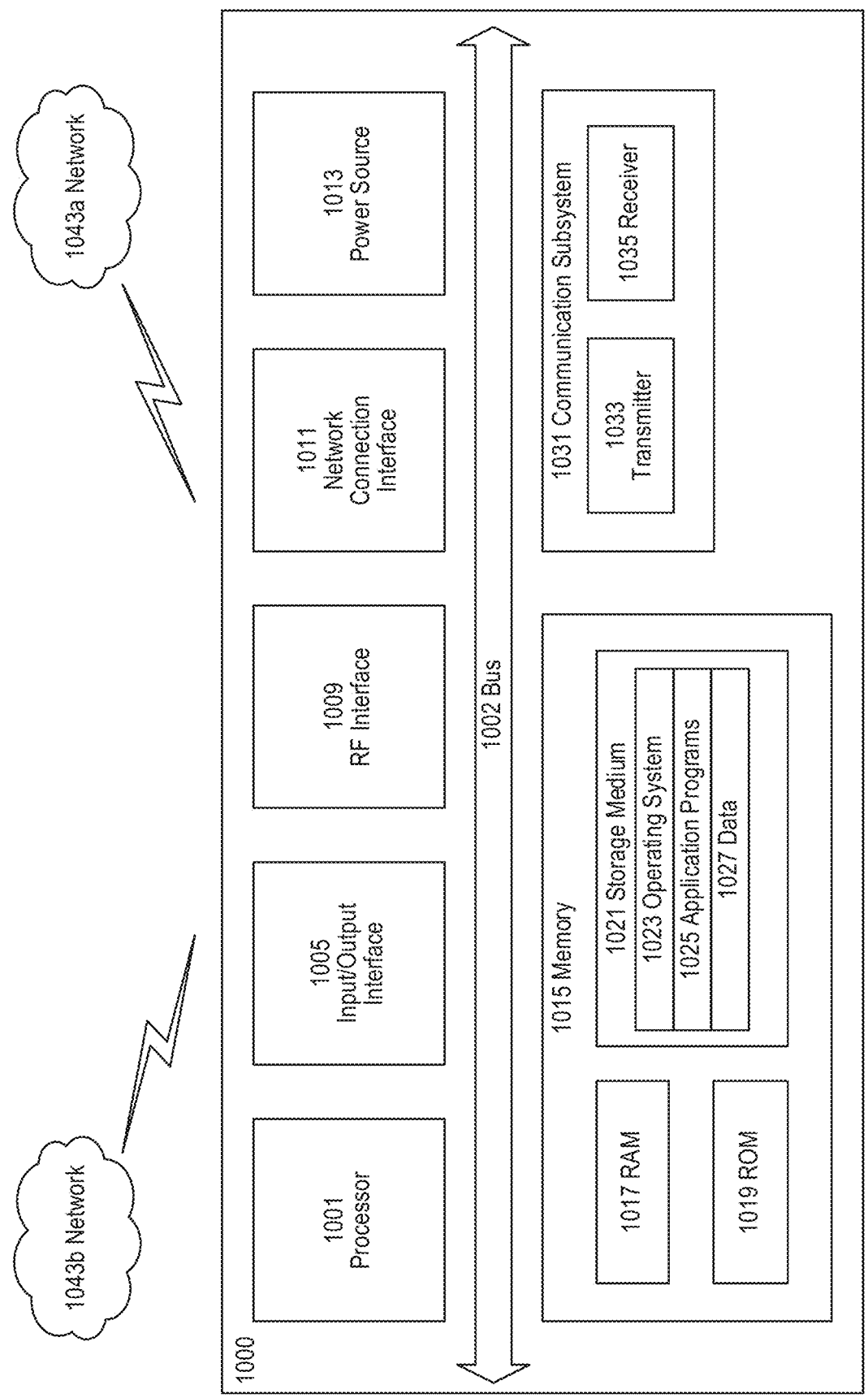
FIG. 10 is a block diagram of an exemplary user equipment (UE) configurable according to various exemplary embodiments of the present disclosure.

FIG. 10 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 10200 can be any UE identified by the 3rd Generation Partnership Project (3GPP), including a NB-IoT UE, a machine type communication (MTC) UE, and/or an enhanced MTC (eMTC) UE. UE 1000, as illustrated in FIG. 10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 can include other similar types of information. Certain UEs can utilize all of the components shown in FIG. 10, or only a subset of the components. The level of integration between the components can vary from one UE to another UE. Further, certain UEs can contain multiple instances of a component, such as multiple processors, memories, transceivers, transmitters, receivers, etc.

In FIG. 10, processing circuitry 1001 can be configured to process computer instructions and data. Processing circuitry 1001 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 can include two central processing units (CPUs). Data can be information in a form suitable for use by a computer.

In the depicted embodiment, input/output interface 1005 can be configured to provide a communication interface to an input device, output device, or input and output device. UE 1000 can be configured to use an output device via input/output interface 1005. An output device can use the same type of interface port as an input device. For example, a USB port can be used to provide input to and output from UE 1000. The output device can be a speaker, a sound card, a video card, a display, a monitor, a printer, an actuator, an emitter, a smartcard, another output device, or any combination thereof. UE 1000 can be configured to use an input device via input/output interface 1005 to allow and/or facilitate a user to capture information into UE 1000. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 10, RF interface 1009 can be configured to provide a communication interface to RF components such as a transmitter, a receiver, and an antenna. Network connection interface 1011 can be configured to provide a communication interface to network 1043a. Network 1043a can encompass wired and/or wireless networks such as a local-area network (LAN), a wide-area network (WAN), a computer network, a wireless network, a telecommunications network, another like network or any combination thereof. For example, network 1043a can comprise a Wi-Fi network. Network connection interface 1011 can be configured to include a receiver and a transmitter interface used to communicate with one or more other devices over a communication network according to one or more communication protocols, such as Ethernet, TCP/IP, SONET, ATM, or the like. Network connection interface 1011 can implement receiver and transmitter functionality appropriate to the communication network links (e.g., optical, electrical, and the like). The transmitter and receiver functions can share circuit components, software or firmware, or alternatively can be implemented separately.

RAM 1017 can be configured to interface via bus 1002 to processing circuitry 1001 to provide storage or caching of data or computer instructions during the execution of software programs such as the operating system, application programs, and device drivers. ROM 1019 can be configured to provide computer instructions or data to processing circuitry 1001. For example, ROM 1019 can be configured to store invariant low-level system code or data for basic system functions such as basic input and output (I/O), startup, or reception of keystrokes from a keyboard that are stored in a non-volatile memory. Storage medium 1021 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 can be configured to include operating system 1023, application program 1025 such as a web browser application, a widget or gadget engine or another application, and data file 1027. Storage medium 1021 can store, for use by UE 1000, any of a variety of various operating systems or combinations of operating systems.

Storage medium 1021 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 can allow and/or facilitate UE 1000 to access computer-executable instructions, application programs or the like, stored on transitory or non-transitory memory media, to off-load data, or to upload data. An article of manufacture, such as one utilizing a communication system can be tangibly embodied in storage medium 1021, which can comprise a device readable medium.

In FIG. 10, processing circuitry 1001 can be configured to communicate with network 1043*b* using communication subsystem 1031. Network 1043*a* and network 1043*b* can be the same network or networks or different network or networks. Communication subsystem 1031 can be configured to include one or more transceivers used to communicate with network 1043*b*. For example, communication subsystem 1031 can be configured to include one or more transceivers used to communicate with one or more remote transceivers of another device capable of wireless communication such as another WD, UE, or base station of a radio access network (RAN) according to one or more communication protocols, such as IEEE 802.10, CDMA, WCDMA, GSM, LTE, UTRAN, WiMax, or the like. Each transceiver can include transmitter 1033 and/or receiver 1035 to implement transmitter or receiver functionality, respectively, appropriate to the RAN links (e.g., frequency allocations and the like). Further, transmitter 1033 and receiver 1035 of each transceiver can share circuit components, software or firmware, or alternatively can be implemented separately.

In the illustrated embodiment, the communication functions of communication subsystem 1031 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 can include cellular communication, Wi-Fi communication, Bluetooth communication, and GPS communication. Network 1043*b* can encompass wired and/or wireless networks such as a local-area network (LAN), a wide-area network (WAN), a computer network, a wireless network, a telecommunications network, another like network or any combination thereof. For example, network 1043*b* can be a cellular network, a Wi-Fi network, and/or a near-field network. Power source 1013 can be configured to provide alternating current (AC) or direct current (DC) power to components of UE 1000.

The features, benefits and/or functions described herein can be implemented in one of the components of UE 1000 or partitioned across multiple components of UE 1000. Further, the features, benefits, and/or functions described herein can be implemented in any combination of hardware, software or firmware. In one example, communication subsystem 1031 can be configured to include any of the components described herein. Further, processing circuitry 1001 can be configured to communicate with any of such components over bus 1002. In another example, any of such components can be represented by program instructions stored in memory that when executed by processing circuitry 1001 perform the corresponding functions described herein. In another example, the functionality of any of such components can be partitioned between processing circuitry 1001 and communication subsystem 1031. In another example, the non-computationally intensive functions of any of such components can be implemented in software or firmware and the computationally intensive functions can be implemented in hardware.

Figure 11:
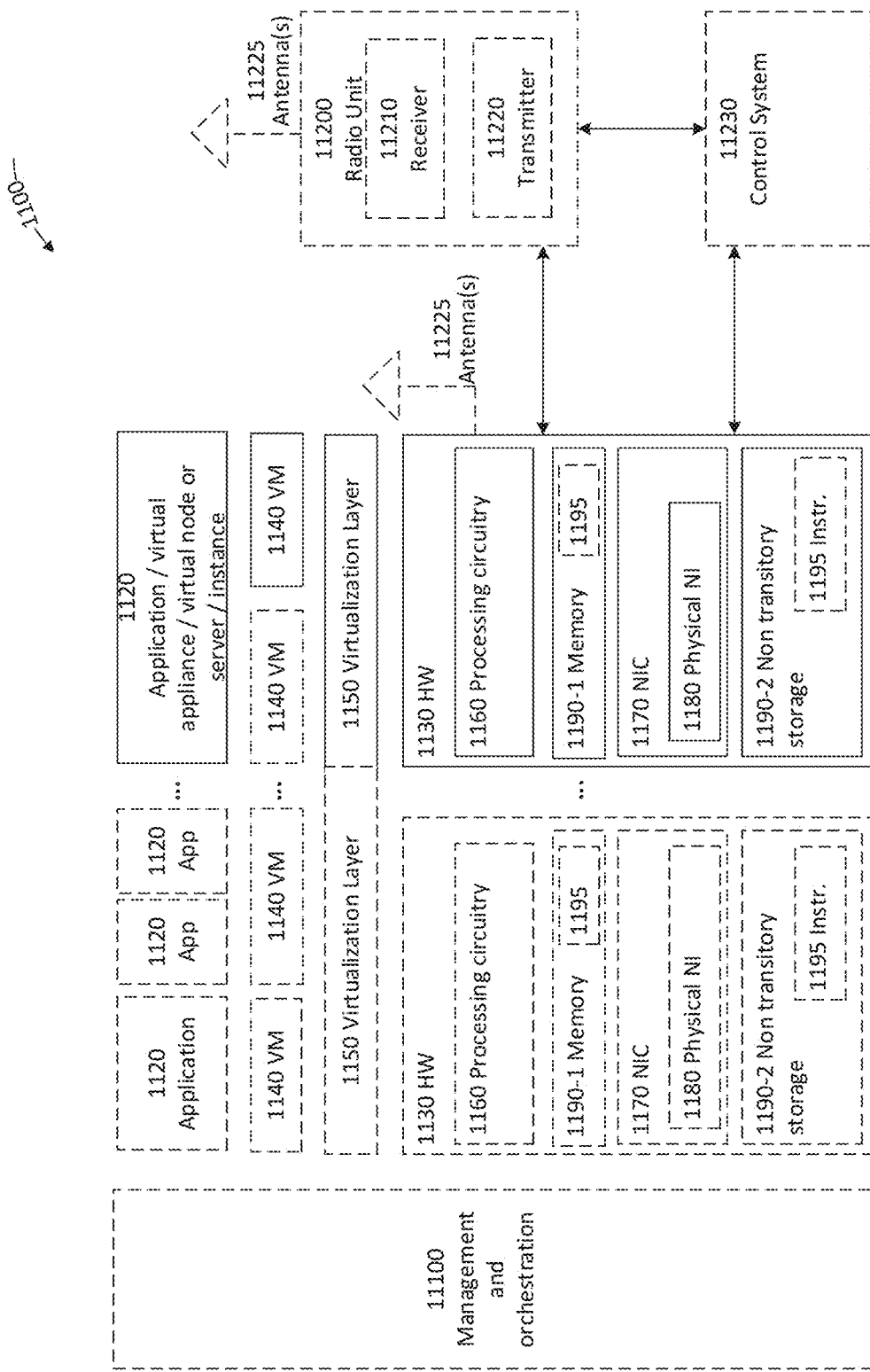
FIG. 11 is a block diagram of illustrating a virtualization environment that can facilitate virtualization of various functions implemented according to various exemplary embodiments of the present disclosure.

FIG. 11 is a schematic block diagram illustrating a virtualization environment 1100 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node can be entirely virtualized.

The functions can be implemented by one or more applications 1120 (which can alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which can be commercial off-the-shelf (COTS) processors, dedicated Application Specific Integrated Circuits (ASICs), or any other type of processing circuitry including digital or analog hardware components or special purpose processors. Each hardware device can comprise memory 1190-1 which can be non-persistent memory for temporarily storing instructions 1195 or software executed by processing circuitry 1160. Each hardware device can comprise one or more network interface controllers (NICs) 1170, also known as network interface cards, which include physical network interface 1180. Each hardware device can also include non-transitory, persistent, machine-readable storage media 1190-2 having stored therein software 1195 and/or instructions executable by processing circuitry 1160. Software 1195 can include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and can be run by a corresponding virtualization layer 1150 or hypervisor. Different embodiments of the instance of virtual appliance 1120 can be implemented on one or more of virtual machines 1140, and the implementations can be made in different ways.

During operation, processing circuitry 1160 executes software 1195 to instantiate the hypervisor or virtualization layer 1150, which can sometimes be referred to as a virtual machine monitor (VMM). Virtualization layer 1150 can present a virtual operating platform that appears like networking hardware to virtual machine 1140.

As shown in FIG. 11, hardware 1130 can be a standalone network node with generic or specific components. Hardware 1130 can comprise antenna 11225 and can implement some functions via virtualization. Alternatively, hardware 1130 can be part of a larger cluster of hardware (e.g., such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1140 can be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 can be coupled to one or more antennas 11225. Radio units 11200 can communicate directly with hardware nodes 1130 via one or more appropriate network interfaces and can be used in combination with the virtual components to provide a virtual node with radio capabilities, such as a radio access node or a base station.

In some embodiments, some signalling can be effected with the use of control system 11230 which can alternatively be used for communication between the hardware nodes 1130 and radio units 11200.

Figure 12:
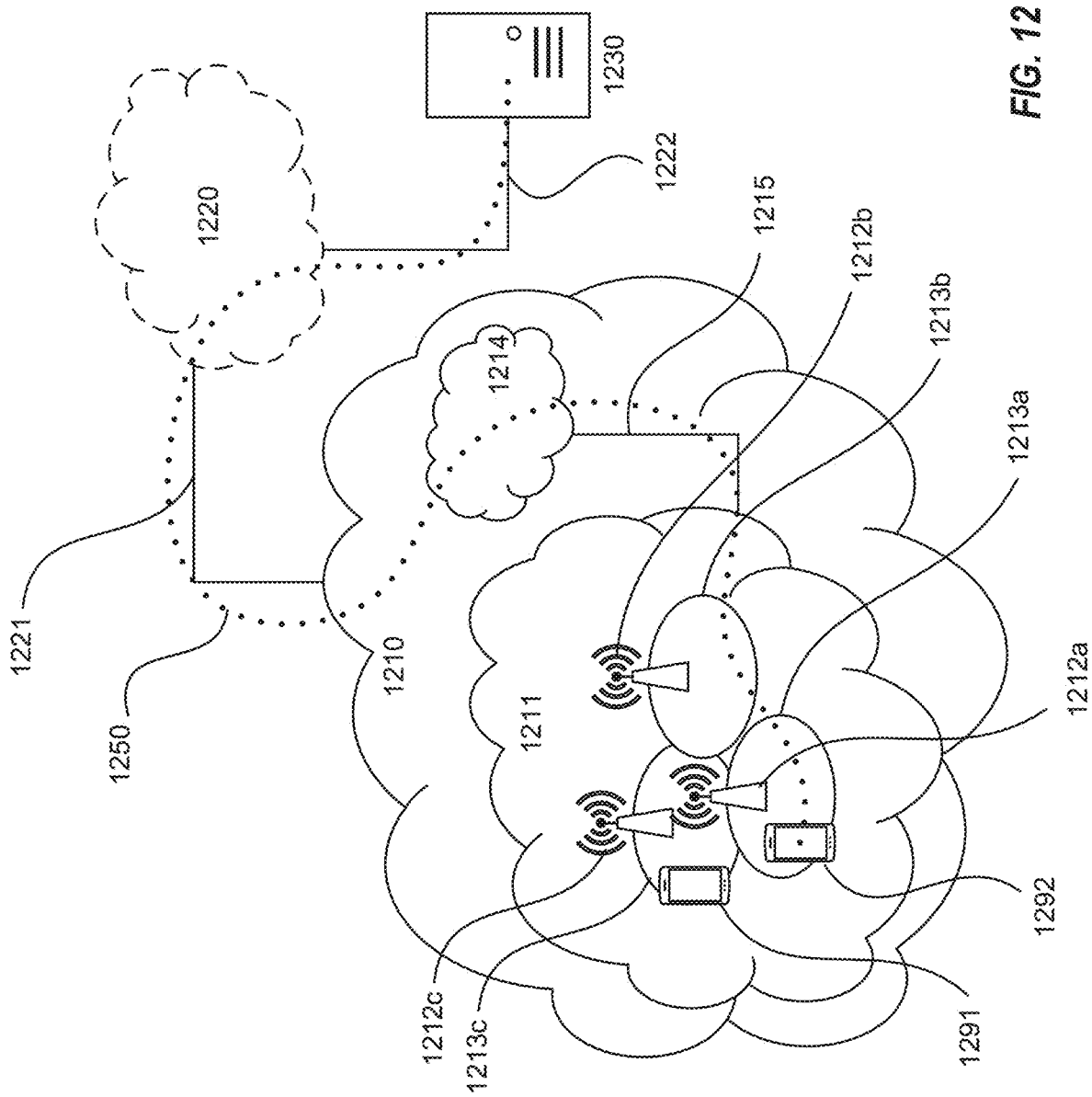
FIGS. 12-13 are block diagrams of exemplary communication systems configurable according to various exemplary embodiments of the present disclosure.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c can be configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the Telecommunication network 1210 is itself connected to host computer 1230, which can be embodied in the hardware and/or software of a standalone server, a cloud-implemented server, a distributed server or as processing resources in a server farm. Host computer 1230 can be under the ownership or control of a service provider, or can be operated by the service provider or on behalf of the service provider. Connections 1221 and 1222 between telecommunication network 1210 and host computer 1230 can extend directly from core network 1214 to host computer 1230 or can go via an optional intermediate network 1220. Intermediate network 1220 can be one of, or a combination of more than one of, a public, private or hosted network; intermediate network 1220, if any, can be a backbone network or the Internet; in particular, intermediate network 1220 can comprise two or more sub-networks (not shown).

The communication system of FIG. 12 as a whole enables connectivity between the connected UEs 1291, 1292 and host computer 1230. The connectivity can be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 can be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which can have storage and/or processing capabilities. In particular, processing circuitry 1318 can comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 can be operable to provide a service to a remote user, such as UE 1330 connecting via OTT connection 1350 terminating at UE 1330 and host computer 1310. In providing the service to the remote user, host application 1312 can provide user data which is transmitted using OTT connection 1350.

Communication system 1300 can also include base station 1320 provided in a telecommunication system and comprising hardware 1325 enabling it to communicate with host computer 1310 and with UE 1330. Hardware 1325 can include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 can be configured to facilitate connection 1360 to host computer 1310. Connection 1360 can be direct or it can pass through a core network (not shown in FIG. 13) of the telecommunication system and/or through one or more intermediate networks outside the telecommunication system. In the embodiment shown, hardware 1325 of base station 1320 can also include processing circuitry 1328, which can comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 can also include UE 1330 already referred to. Its hardware 1335 can include radio interface 1337 configured to set up and maintain wireless connection 1370 with a base station serving a coverage area in which UE 1330 is currently located. Hardware 1335 of UE 1330 can also include processing circuitry 1338, which can comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 can be operable to provide a service to a human or non-human user via UE 1330, with the support of host computer 1310. In host computer 1310, an executing host application 1312 can communicate with the executing client application 1332 via OTT connection 1350 terminating at UE 1330 and host computer 1310. In providing the service to the user, client application 1332 can receive request data from host application 1312 and provide user data in response to the request data. OTT connection 1350 can transfer both the request data and the user data. Client application 1332 can interact with the user to generate the user data that it provides.

Figure 13:
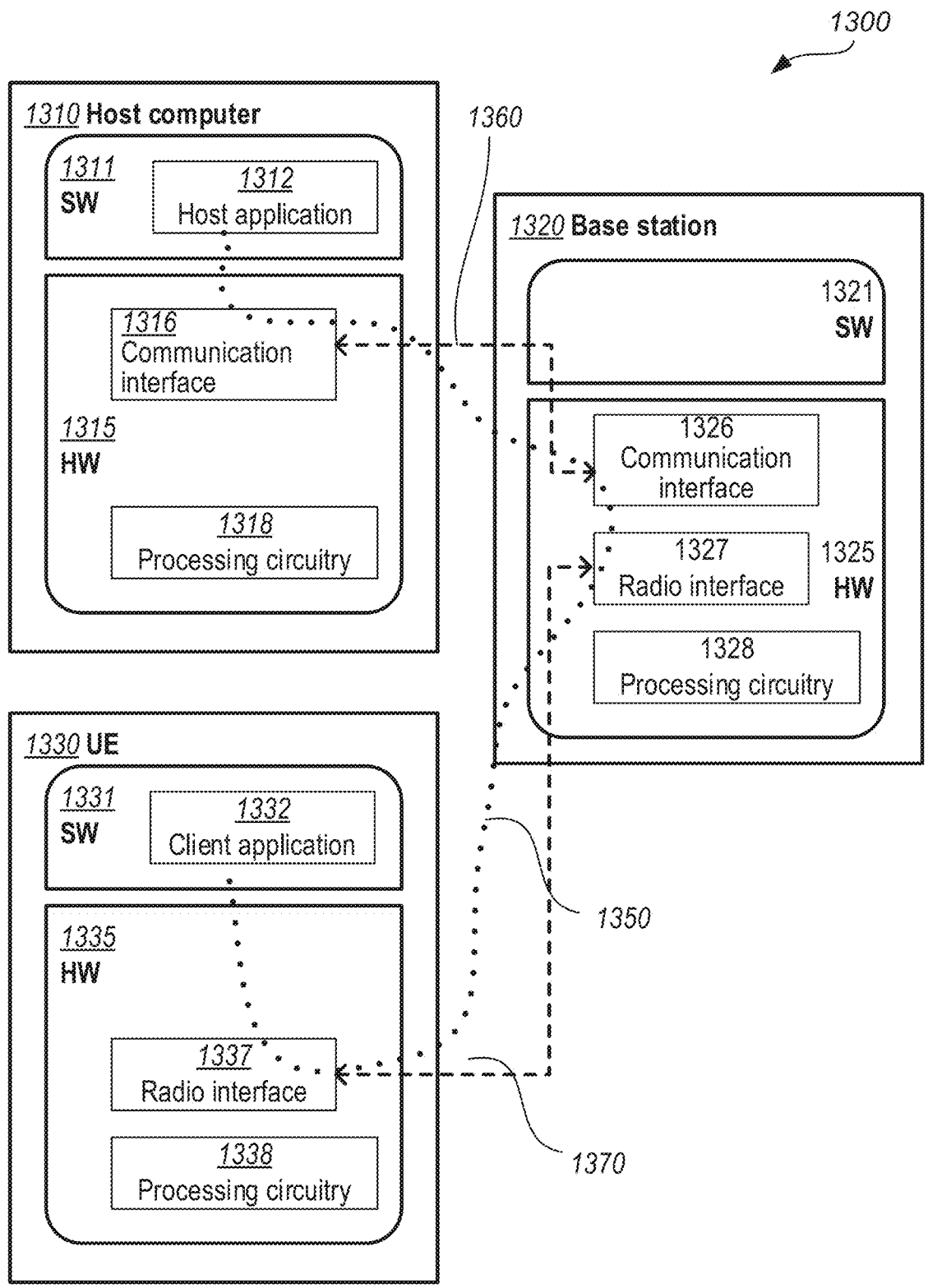

It is noted that host computer 1310, base station 1320 and UE 1330 illustrated in FIG. 13 can be similar or identical to host computer 1230, one of base stations 1212a, 1212b, 1212c and one of UEs 1291, 1292 of FIG. 12, respectively. This is to say, the inner workings of these entities can be as shown in FIG. 13 and independently, the surrounding network topology can be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure can determine the routing, which it can be configured to hide from UE 1330 or from the service provider operating host computer 1310, or both. While OTT connection 1350 is active, the network infrastructure can further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1350 between host computer 1310 and UE 1330, in response to variations in the measurement results. The measurement procedure and/or the network functionality for reconfiguring OTT connection 1350 can be implemented in software 1311 and hardware 1315 of host computer 1310 or in software 1331 and hardware 1335 of UE 1330, or both. In embodiments, sensors (not shown) can be deployed in or in association with communication devices through which OTT connection 1350 passes; the sensors can participate in the measurement procedure by supplying values of the monitored quantities exemplified above, or supplying values of other physical quantities from which software 1311, 1331 can compute or estimate the monitored quantities. The reconfiguring of OTT connection 1350 can include message format, retransmission settings, preferred routing etc.; the reconfiguring need not affect base station 1320, and it can be unknown or imperceptible to base station 1320. Such procedures and functionalities can be known and practiced in the art. In certain embodiments, measurements can involve proprietary UE signaling facilitating host computer 1310's measurements of throughput, propagation times, latency and the like. The measurements can be implemented in that software 1311 and 1331 causes messages to be transmitted, in particular empty or 'dummy' messages, using OTT connection 1350 while it monitors propagation times, errors etc.

Figures 14, 15:
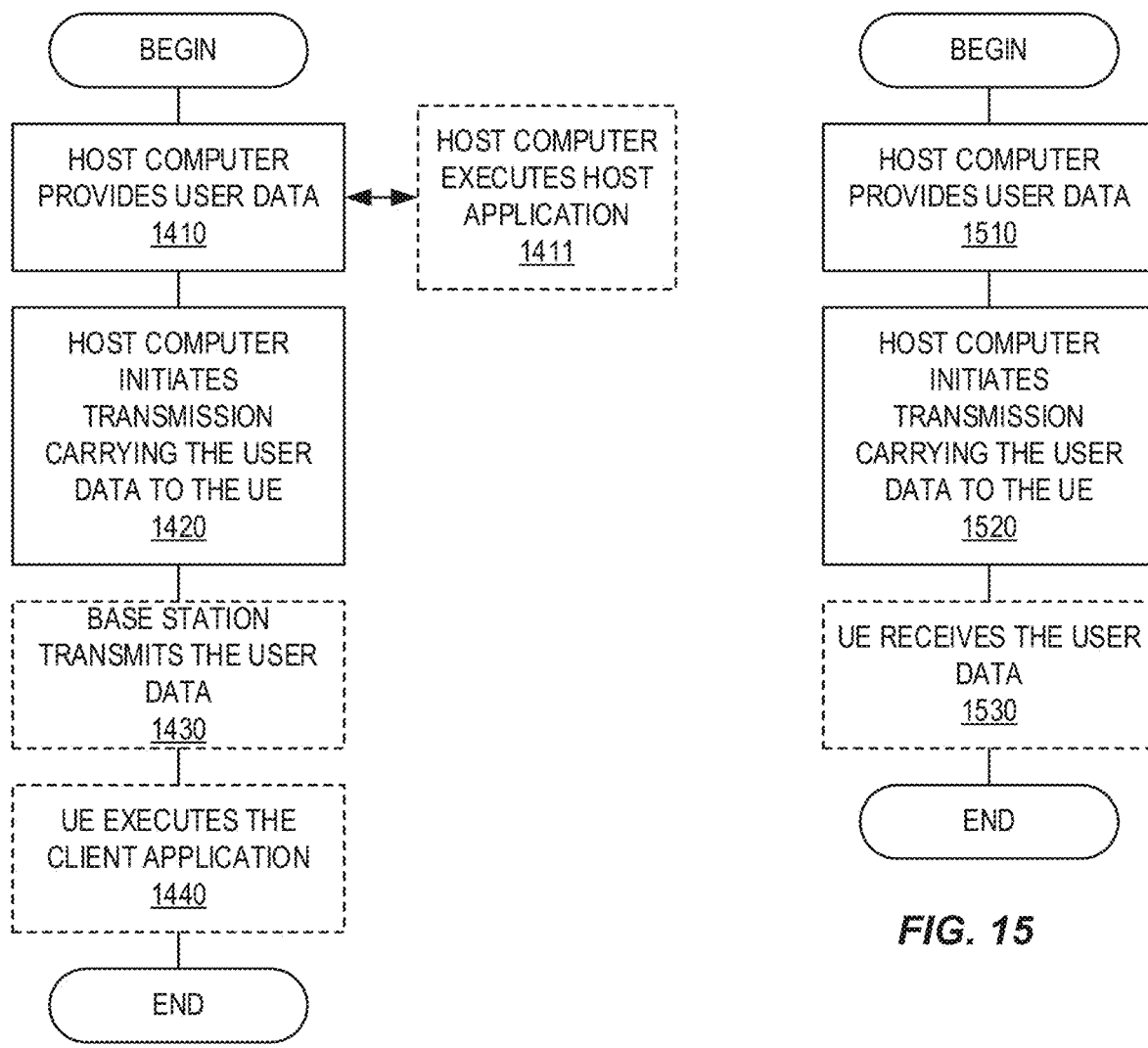

FIG. 14 is a flowchart illustrating an exemplary method and/or procedure implemented in a communication system, in accordance with one embodiment. The communication system includes a host computer, a base station and a UE which, in some exemplary embodiments, can be those described with reference to FIGS. 12 and 13. For simplicity of the present disclosure, only drawing references to FIG. 14 will be included in this section. In step 1410, the host computer provides user data. In substep 1411 (which can be optional) of step 1410, the host computer provides the user data by executing a host application. In step 1420, the host computer initiates a transmission carrying the user data to the UE. In step 1430 (which can be optional), the base station transmits to the UE the user data which was carried in the transmission that the host computer initiated, in accordance with the teachings of the embodiments described throughout this disclosure. In step 1440 (which can also be optional), the UE executes a client application associated with the host application executed by the host computer.

FIG. 15 is a flowchart illustrating an exemplary method and/or procedure implemented in a communication system, in accordance with one embodiment. The communication system includes a host computer, a base station and a UE which can be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission can pass via the base station, in accordance with the teachings of the embodiments described throughout this disclosure. In step 1530 (which can be optional), the UE receives the user data carried in the transmission.

FIG. 16 is a flowchart illustrating an exemplary method and/or procedure implemented in a communication system, in accordance with one embodiment. The communication system includes a host computer, a base station and a UE which can be those described with reference to FIGS. 12 and 13. For simplicity of the present disclosure, only drawing references to FIG. 16 will be included in this section. In step 1610 (which can be optional), the UE receives input data provided by the host computer. Additionally or alternatively, in step 1620, the UE provides user data. In substep 1621 (which can be optional) of step 1620, the UE provides the user data by executing a client application. In substep 1611 (which can be optional) of step 1610, the UE executes a client application which provides the user data in reaction to the received input data provided by the host computer. In providing the user data, the executed client application can further consider user input received from the user. Regardless of the specific manner in which the user data was provided, the UE initiates, in substep 1630 (which can be optional), transmission of the user data to the host computer. In step 1640 of the method, the host computer receives the user data transmitted from the UE, in accordance with the teachings of the embodiments described throughout this disclosure.

FIG. 17 is a flowchart illustrating an exemplary method and/or procedure implemented in a communication system, in accordance with one embodiment. The communication system includes a host computer, a base station and a UE which can be those described with reference to FIGS. 12 and 13. For simplicity of the present disclosure, only drawing references to FIG. 17 will be included in this section. In step 1710 (which can be optional), in accordance with the teachings of the embodiments described throughout this disclosure, the base station receives user data from the UE. In step 1720 (which can be optional), the base station initiates transmission of the received user data to the host computer. In step 1730 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

As used herein, a "radio access node" (or "radio network node") can be any node in a radio access network (RAN) that operates to wirelessly transmit and/or receive signals. Some examples of radio access nodes include, but are not limited to, a base station (e.g., a New Radio (NR) base station (gNB) in a 3GPP Fifth Generation (5G) NR network or an eNB in a 3GPP LTE network), a high-power or macro base station, a low-power base station (e.g., a micro base station, a pico base station, a home eNB, or the like), a relay node, access point (AP), radio AP, remote radio unit (RRU), remote radio head (RRH), a multi-standard BS (e.g., MSR BS), multi-cell/multicast coordination entity (MCE), base transceiver station (BTS), base station controller (BSC), network controller, NodeB (NB), etc. Such terms can also be used to reference to components of a node, such as a gNB-CU and/or a gNB-DU.

As used herein, the term "radio node" can refer to a wireless device (WD) or a radio network node.

As used herein, a "core network node" can be any type of node in a core network. Some examples of a core network node include, e.g., a Mobility Management Entity (MME), a Packet Data Network Gateway (P-GW), a Service Capability Exposure Function (SCEF), Access and Mobility Management Function (AMF), User Plane Function (UPF), Home Subscriber Server (HSS), etc.

As used herein, a "network node" is any node that is part of a radio access network (e.g., a "radio network node" or "radio access node") or a core network (e.g., a "core network node") of a wireless communication system, such as a cellular communications network/system.

In some embodiments, the non-limiting terms "wireless device" (WD) or "user equipment" (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine-to-machine communication (M2M), UE category narrow band 1 (NB1), UE category NB2, UE category M1, UE category M2, low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the term "slot" is used to indicate a radio resource; however, it should be understood that the techniques described herein may advantageously be used with other types of radio resources, such as any type of physical resource or radio resource expressed in terms of length of time. Examples of time resources are: symbol, time slot, minislot, subframe, radio frame, transmission time interval (TTI), interleaving time, a time resource number, etc.

In some embodiments, a transmitter (e.g., network node) and a receiver (e.g., WD) previously agrees on rule(s) for determining for which resources the transmitter and receiver will arrange one or more physical channels during transmission of the resources, and this rule may, in some embodiments, be referred to as "mapping." In other embodiments, the term "mapping" may have other meanings.

As used herein, a "channel" can be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction.

Furthermore, although the term "cell" is used herein, it should be understood that (particularly with respect to 5G NR) beams may be used instead of cells and, as such, concepts described herein apply equally to both cells and beams.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the concepts, principles, and/or embodiments described herein.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The invention claimed is:

1. A method performed by a V2X user equipment (UE) for service discovery from a V2X application server (AS), the method comprising:
   sending, to a first address associated with the V2X AS, a first discovery request for further address information associated with the V2X AS; and
   receiving, from the first address via unicast signaling, a first discovery response including the requested further address information, which facilitates UE discovery of V2X services available via unicast communication between the V2X UE and a radio access network (RAN).

2. The method of claim 1, wherein the first discovery request is sent, and the first discovery response is received, via a Third-Generation Partnership Project (3GPP)-specified V1 interface between the V2X UE and the V2X AS.

3. The method of claim 1, wherein one or more of the following applies:
   the first address is an address of a configuration management server of the V2X AS; and
   the first address is pre-configured in the V2X UE.

4. The method of claim 1, wherein the first discovery request includes an identifier of the V2X UE but the first discovery response does not include the identifier of the V2X UE.

5. The method of claim 1, wherein the further address information associated with the V2X AS comprises one or more of the following:
   a transport port;
   one or more fully-qualified domain names (FQDNs);
   one or more Internet Protocol (IP) addresses;
   an identifier of an associated geographical area; and
   identifiers of one or more associated public land mobile networks (PLMNs).

6. The method of claim 1, further comprising:
sending, to the further address information associated with the V2X AS, a second discovery request for V2X services available via unicast communication; and
receiving, from the V2X AS in response the second discovery request, a second discovery response comprising:
identification of one or more V2X services available via unicast communication between the V2X UE and the RAN; and
information mapping the identified services to the further address information received in the first response.

7. The method of claim 6, wherein the second discovery request includes one or more of the following: an identifier of the V2X UE, and one or more filtering criteria for services of interest to the V2X UE.

8. The method of claim 6, wherein:
the V2X UE includes a configuration management client and a V2X application enabler (VAE) client;
the configuration management client sends the first discovery request and receives the first discovery response; and
the VAE client sends the second discovery request and receives the second discovery response.

9. The method of claim 6, wherein the identification of the one or more V2X services includes identification of respective protocol versions of the one or more V2X services.

10. The method of claim 6, further comprising receiving, from the V2X AS, a subsequent message comprising updates related to one or more of the following:
the one or more services identified in the further message; and
one or more further services associated with the V2X AS but not identified in the further message,
wherein the subsequent message is received via one of the following: unicast from the RAN, broadcast via the RAN, or broadcast from another V2X UE.

11. A method performed by a V2X application server (AS) for facilitating service discovery by one or more V2X user equipment (UE), the method comprising:
receiving, at a first address associated with the V2X AS, a first discovery request from a V2X UE for further address information associated with the V2X AS; and
sending, from the first address to the V2X UE via unicast signaling, a first discovery response comprising the requested further address information, which facilitates UE discovery of V2X services available via unicast communication between the V2X UE and a radio access network (RAN).

12. The method of claim 11, wherein the first discovery request is received, and the first discovery response is sent, via a Third-Generation Partnership Project (3GPP)-specified V1 interface between the V2X UE and the V2X AS.

13. The method of claim 11, wherein one or more of the following applies:
the first address is an address of a configuration management server of the V2X AS; and
the first address is pre-configured in the V2X UE.

14. The method of claim 11, wherein the first discovery request includes an identifier of the V2X UE but the first discovery response does not include the identifier of the V2X UE.

15. The method of claim 11, wherein the further address information associated with the V2X AS comprises one or more of the following:
a transport port;
one or more fully-qualified domain names (FQDNs);
one or more Internet Protocol (IP) addresses;
an identifier of an associated geographical area; and
identifiers of one or more associated public land mobile networks (PLMNs).

16. The method of claim 11, further comprising:
receiving, at the further address information associated with the V2X AS, a second discovery request from the UE for V2X services available via unicast communication; and
sending, to the V2X UE in response the second discovery request, a second discovery response comprising:
identification of one or more V2X services available via unicast communication between the V2X UE and the RAN; and
information mapping the identified services to the further address information received in the first response.

17. The method of claim 16, wherein the second discovery request includes one or more of the following: an identifier of the V2X UE, and one or more filtering criteria for services of interest to the V2X UE.

18. The method of claim 16, wherein:
the V2X AS includes a configuration management server and a V2X application enabler (VAE) server;
the configuration management server receives the first discovery request and sends the first discovery response; and
the VAE server receives the second discovery request and sends the second discovery response.

19. The method of claim 16, wherein the identification of the one or more V2X services includes identification of respective protocol versions of the one or more V2X services.

20. The method of claim 16, further comprising sending, to the V2X UE, a subsequent message comprising updates related to one or more of the following:
the one or more services identified in the further message; and
one or more further services associated with the V2X AS but not identified in the further message,
wherein the subsequent message is sent via one of the following: unicast from the RAN, broadcast from the RAN, or broadcast from another V2X UE.

21. A V2X user equipment (UE) configured for service discovery from a V2X application server (AS), the V2X UE comprising:
transceiver circuitry configured to communicate with the V2X AS via a radio access network, RAN; and
processing circuitry operably coupled to the transceiver circuitry, wherein the processing circuitry and the transceiver circuitry are configured to perform operations corresponding to the method of claim 1.

22. A V2X application server (AS) configured to facilitate service discovery by one or more V2X user equipment (UE), the V2X AS comprising:
network interface circuitry configured to communicate with the one or more V2X UEs via a radio access network (RAN); and
processing circuitry operably coupled to the network interface circuitry, wherein the processing circuitry and the transceiver circuitry are configured to perform operations corresponding to the method of claim 11.

* * * * *

UNITED STATES PATENT AND TRADEMARK OFFICE
CERTIFICATE OF CORRECTION

| | |
|---|---|
| PATENT NO. | : 12,004,057 B2 |
| APPLICATION NO. | : 17/975678 |
| DATED | : June 4, 2024 |
| INVENTOR(S) | : El Essaili et al. |

It is certified that error appears in the above-identified patent and that said Letters Patent is hereby corrected as shown below:

On the Title Page

In Item (72), under "Inventors", in Column 1, Line 4, delete "Dusseldorf" and insert -- Düsseldorf --, therefor.

On Page 2, in Item (56), under "OTHER PUBLICATIONS", in Column 2, Line 1, delete "Ts" and insert -- TS --, therefor.

In the Drawings

In Fig. 9, Sheet 7 of 13, for Tag "972", in Line 1, delete "Tranceiver" and insert -- Transceiver --, therefor.

In the Specification

In Column 1, Line 54, delete "user case" and insert -- use case --, therefor.

In Column 1, Lines 57-58, delete "Technical Standard (TS)" and insert -- Technical Specification (TS) --, therefor.

In Column 2, Line 31, delete "Evovled Packet Subsystem (EPS)" and insert -- Evolved Packet System (EPS) --, therefor.

In Column 2, Lines 31-32, delete "5G subsystem (5GS))" and insert -- 5G system (5GS)) --, therefor.

In Column 3, Line 31, delete "equipment (UE, e.g.," and insert -- equipment, UE, (e.g., --, therefor.

In Column 4, Line 8, delete "response" and insert -- response to --, therefor.

In Column 4, Line 54, delete "response" and insert -- response to --, therefor.

Signed and Sealed this
First Day of October, 2024

*Katherine Kelly Vidal*

Katherine Kelly Vidal
*Director of the United States Patent and Trademark Office*

CERTIFICATE OF CORRECTION (continued)
U.S. Pat. No. 12,004,057 B2

In Column 5, Line 43, delete "of illustrating" and insert -- illustrating --, therefor.

In Column 7, Line 4, delete ""[a]dditional" and insert -- "additional --, therefor.

In Column 7, Line 28, delete "Sever" and insert -- Server --, therefor.

In Column 8, Line 65, delete "get V2X" and insert -- to get a V2X --, therefor.

In Column 10, Line 23, delete "appropriate" and insert -- appropriate to --, therefor.

In Column 10, Lines 28-29, delete "equipment (UE, e.g.," and insert -- equipment, UE, (e.g., --, therefor.

In Column 10, Line 29, delete "loT device," and insert -- IoT device, --, therefor.

In Column 11, Line 22, delete "response" and insert -- response to --, therefor.

In Column 12, Line 40, delete "response" and insert -- response to --, therefor.

In Column 16, Lines 43-44, delete "radio front end circuitry 990" and insert -- radio front end circuitry 992 --, therefor.

In Column 17, Line 61, delete "(CPE). a" and insert -- (CPE), a --, therefor.

In Column 17, Line 62, delete "etc.." and insert -- etc. --, therefor.

In Column 18, Line 13, delete "etc.) personal" and insert -- etc.), personal --, therefor.

In Column 18, Lines 48-49, delete "Radio front end circuitry 914" and insert -- Radio front end circuitry 912 --, therefor.

In Column 21, Line 34, delete "interchangeable." and insert -- interchangeably. --, therefor.

In Column 21, Line 43, delete "power source 1033," and insert -- power source 1013, --, therefor.

In Column 24, Line 47, delete "memory 1190. Memory 1190" and insert -- memory 1190-1. Memory 1190-1 --, therefor.

In Column 30, Line 24, delete "multi-standard BS" and insert -- multi-standard radio BS --, therefor.

In Column 30, Line 28, delete "reference" and insert -- refer --, therefor.

In Column 30, Line 53, delete "UE category Ml," and insert -- UE category M1, --, therefor.

In Column 30, Line 55, delete "equipped" and insert -- equipment --, therefor.

CERTIFICATE OF CORRECTION (continued)
U.S. Pat. No. 12,004,057 B2

In Column 30, Line 58, delete "(NB-IOT)" and insert -- (NB-IoT) --, therefor.

In Column 31, Line 2, delete "agrees" and insert -- agreed --, therefor.

In the Claims

In Column 33, Line 5, in Claim 6, delete "response" and insert -- response to --, therefor.

In Column 34, Line 11, in Claim 16, delete "response" and insert -- response to --, therefor.